US006598017B1

(12) United States Patent
Yamamoto et al.

(10) Patent No.: US 6,598,017 B1
(45) Date of Patent: Jul. 22, 2003

(54) METHOD AND APPARATUS FOR RECOGNIZING SPEECH INFORMATION BASED ON PREDICTION

(75) Inventors: Naoko Yamamoto, Yokohama (JP); Aruna Rohra Suda, Yokohama (JP); Masanori Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/356,691

(22) Filed: Jul. 20, 1999

(30) Foreign Application Priority Data

Jul. 27, 1998 (JP) .......................................... 10-210979
Jul. 15, 1999 (JP) .......................................... 11-201528

(51) Int. Cl.[7] .............................................. G10L 15/20
(52) U.S. Cl. ........................ 704/251; 704/235; 704/255
(58) Field of Search ................................ 704/235, 240, 704/255, 241, 243, 251, 256, 257, 259

(56) References Cited

U.S. PATENT DOCUMENTS

| | | | | |
|---|---|---|---|---|
| 4,783,803 A | * | 11/1988 | Baker et al. ................. | 704/252 |
| 4,896,358 A | * | 1/1990 | Bahler et al. ................. | 704/251 |
| 4,937,870 A | | 6/1990 | Bossemeyer, Jr. ............ | 381/43 |
| 5,233,681 A | * | 8/1993 | Bahl et al. ................... | 704/251 |
| 5,241,619 A | * | 8/1993 | Schwartz et al. ........... | 704/200 |
| 5,267,345 A | * | 11/1993 | Brown et al. ................ | 704/255 |
| 5,652,898 A | * | 7/1997 | Kaji ............................. | 704/10 |
| 5,764,852 A | * | 6/1998 | Williams .................... | 704/251 |
| 5,897,646 A | | 4/1999 | Suda et al. | |
| 5,903,864 A | * | 5/1999 | Gadbois et al. ............. | 704/251 |
| 5,957,520 A | | 9/1999 | Suda et al. | |
| 6,029,123 A | * | 2/2000 | Suda et al. ..................... | 704/9 |

FOREIGN PATENT DOCUMENTS

EP        0 344 017        11/1989

OTHER PUBLICATIONS

Patent Abstract of Japan, vol. 017, No. 419, Aug. 4, 1993, Abstract of JP 5–080793
Patent Abstract of Japan, vol. 1988, No. 07, Mar. 31, 1998, Abstract of JP 1–088600.
Kawahara, et al., "Heuristic Search Integrating Syntactic, Semantic and Dialog–Level Constraints,"Proceedings of the International Conference on Acoustics, Speech, and Signal Processing, US, New York, IEEE, vol. Conf. 19, 1994, pp. II–25–II–28.
Glass, et al., "Multilingual spoken–language understanding the MIT Voyager system," Speech Communication, NL, Elesvier Science Publishers, Amsterdam, vol. 17, No. 1/02, Aug. 1, 1995, pp. 1–18.
Iida, et al., "Predicting the Next Utterance Linguistic Expressions Using Contextual Information," IEICE Transactions on Information and Systems, JP, Institute of Electronic Information and Comm. Eng. Tokyo, vol. E76–D, No. 1, Jan. 1, 1993, pp. 62–73.
Setlur, et al., "Correcting Recognition Errors Via Discriminative Utterance Verification,", Proceeding ICSLP 96. Fourth International Conference on Spoken Language Processing (Cat. No. 96TH8206), Proceeding of Fourth International Conference on Spoken Language Processing. ICSLP 96, Philadelphia, Oct. 3–6, 1996, pp. 602–605, vol. 2.

*Primary Examiner*—Daniel Abebe
(74) *Attorney, Agent, or Firm*—Fitzpatrick, Cella, Harper & Scinto

(57) ABSTRACT

An apparatus for recognizing sound information includes a sound recognition unit for recognizing sound information. A knowledge base stores knowledge concerning a type of data represented by the sound information. A prediction unit predicts the type of data represented by sound information to be subsequently recognized by checking the knowledge stored in the knowledge base. The sound recognition unit recognizes sound information to be subsequently recognized based on a prediction result obtained by the prediction unit. With this arrangement, the recognition accuracy is enhanced.

77 Claims, 39 Drawing Sheets

Act
   action        "#' ? @ k . S $ n #";
   access        "#' ? @ k . S $ n #";
Act2
   created       "#' k R+ i . ' e & I . t I d #";
   modified      "#' m A . d $ . f a & I d #";
Prep
   at             "#' ? @ t #";
   by             "#' b a & I #";
Prep2
   after         "#' ? @ f . t $ R+ #";
   before        "#' b I . ' f O R+ #";
   till          "#' t I l #";
   until         "#' ? $ n . ' t I l #";
Prep3
   of             "#' ? ^ v #";
Adv
   all            "#' ? O l #";
   new           "#' n u #";
   previous    "#' p R+ i . v i . $ s #";
Adj
   immediately    "#' ? I . ' m i . d j $ t . l i #";
Object
   document      "#' d A . k j $ . m E n t #";
   email         "#' ? i . m e & I l #";
   file          "#' f a & I l #";
   mail          "#' m e & I l #";
   list          "#' l I s t #";

FIG. 14

Name
- *Person*
- *Machine*

Time
- *day*
- *month*

Number
- *cardinal number*
- *ordinal number*

Alphabet

FIG. 15

SYLLABLE DICTIONARY

| can | mail | To |
|---|---|---|
| cel | do | by |
| pri | cu | from |
| nd | me | ⋮ |
| nt | nt | ⋮ |
| se | file | |
| ⋮ | ⋮ | |
| ⋮ | ⋮ | |

FIG. 25

WORD DICTIONARY

| send | se # | nd |
|---|---|---|
| print | pri # | nt |
| cancel | can # | cel |
| ⋮ | ⋮ | ⋮ |
| ⋮ | ⋮ | ⋮ |

| to | to |
|---|---|
| by | by |
| from | from |
| ⋮ | ⋮ |
| ⋮ | ⋮ |

| mail | mail # | | | |
|---|---|---|---|---|
| document | do # | cu # | me # | nt |
| file | file | | | |
| ⋮ | ⋮ | ⋮ | ⋮ | ⋮ |
| ⋮ | ⋮ | ⋮ | ⋮ | ⋮ |

| 0 |
|---|
| 1 |
| 2 |
| ⋮ |
| two |
| ⋮ |

FIG. 26

LANGUAGE

```
Send : Verb wform Obj Iobj *Instrument
Print : Verb wform Obj Iobj
Mail : noun countable
...
```

FIG. 29

CONCEPT

```
Send : PTRANS
Print : PACT
Mail : DOCUMENT
...
```

FIG. 30

RULE

```
Send  : to May
Print : at Printer1
Mail  : From John
...
```

FIG. 31

WORD DICTIONARY

| | W[i] | 1 | 2 | R[i] |
|---|---|---|---|---|
| 1 | send | se | # nd | |
| 2 | print | pri | # nt | |
| ⋮ | ⋮ | ⋮ | | |
| i | W[i] | S[i][1] | # S[i][2] # ... # S[i][R[i]] | |
| ⋮ | ⋮ | ⋮ | | |
| M | | | | |

R[i] spans columns 1, 2, ..., R[i]. M rows total.

FIG. 32

SYLLABLE RECOGNITION RESULT

|   | C[k] | A[k] |
|---|------|------|
| 1 | nd | 60.4 |
| 2 | pri | 53.7 |
| ⋮ | ⋮ | ⋮ |
| k | C[k] | A[k] |
| ⋮ | ⋮ | ⋮ |
| N | ⋮ | ⋮ |

N rows

FIG. 33

CUMULATIVE THE SIMILARITY (STATE VOLUMN) $g(t, j)$ $$g(t, j) = \max \begin{bmatrix} g(t-2, j-1) + 2d(t-1, j) + d(t, j)\Lambda & (1) \\ g(t-1, j-1) + 2d(t, j)\Lambda & (2) \\ g(t-1, j-2) + 2d(t, j-1) + d(t, j)\Lambda & (3) \end{bmatrix}$$

LENGTH OF OPTIMAL PATH $c(t, j)$ $$c(t, j) = \max \begin{bmatrix} c(t-2, j-1) + 3\Lambda & \text{if } (1) \\ c(t-1, j-1) + 2\Lambda & \text{if } (2) \\ c(t-1, j-2) + 3\Lambda & \text{if } (3) \end{bmatrix}$$

SYLLABLE RECOGNITION RESULT

T=0

$N=5\begin{cases} \end{cases}$

| | | |
|---|---|---|
| 1 | nd | 61.0 |
| 2 | se | 60.4 |
| 3 | pri | 53.7 |
| 4 | com | 29.1 |
| 5 | nt | 20.6 |

T=1

N=1

| | |
|---|---|
| nd | 100.0 |

FIG. 35

WORD DICTIONARY $M=3\begin{cases} \end{cases}$

| | W[i] | R[i] 1 | 2 | 3 | 4 |
|---|---|---|---|---|---|
| 1 | send | se | #nd | | |
| 2 | print | pri | #nt | | |
| 3 | communicate | com | #mu | #ni | #cate |

FIG. 36

METHOD AND APPARATUS FOR RECOGNIZING SPEECH INFORMATION BASED ON PREDICTION

BACKGROUND OF THE INVENTION

1. Field of the Invention

The present invention broadly relates to speech recognition and, more particularly, to a method and an apparatus for recognizing speech information based on a prediction concerning an object to be recognized. The invention also relates to a storage medium for storing a program implementing the above method.

2. Description of the Related Art

Speech recognition is primarily divided into two types of methods, i.e., a word speech-recognition method and a clause speech-recognition method. According to the word speech-recognition method, an input speech waveform is analyzed, and features are extracted from the waveform to produce a feature time series. Then, the similarity of the features in relation to the word dictionary represented by the feature time series which has been similarly obtained is calculated, and the calculated word is output as a recognition result. In the clause speech-recognition method, input speech is converted into phoneme strings, which are substituted by word strings. The word strings are then parsed, and are converted into character strings. Logic analyses and semantic analyses are then made on the character strings, so that a sentence is produced and output. Further research is being conducted on a method of providing word class information for homonyms, and a method of converting input speech into compound nouns or into a single clause. It is however very difficult to implement such methods.

In most cases, during conversation, humans recognize the speaker's voice by understanding it as one meaning. While the speaker is speaking, the listener supports his/her understanding by predicting the content of the speech to some degree according to the previous topic and common sense. Consequently, even if the speaker wrongly selects or pronounces some words, the listener understand him/her without any problem. Even if there are many homonyms in a conversation, the listener can determine which word the speaker means.

In contrast, conventional speech recognition systems perform speech recognition according to pattern matching. More specifically, a dictionary provided for a system is searched for possible words which match a certain portion of an input speech waveform, and the searched words are output. Among the output words, the optimal word is selected. With this arrangement, if speech recognition fails while it is being conducted, the subsequent processing is spoilt.

Additionally, in most conventional speech recognition systems, it is assumed that input speech to be recognized satisfies the syntax of a certain language. Thus, various determinations are made in a speech recognition module, and the determination result is transferred to another process (another module). More specifically, in a speech recognition module, speech information is uniquely determined as a system command by being filtered (parsed). Not only processing for grammatically correct speech, but also processing for unnecessary words, such as exclamations and restated words, and for non-grammatical speech, such as anastrophy (inversion) and particle dropping is handled by language processing (verifying such words against a word database or a grammar database).

However, since parsing is performed in order to analyze the structure of syntax, elements other than syntax information are rejected. Even if a word is determined to be a significant word after parsing, general knowledge or knowledge of a specific field is not considered.

An example of conventional speech recognition systems is shown in FIG. 42. Since the flow of processing executed on input speech is unidirectional, the system processing continues to proceed in the same direction even if the processing result of a speech recognition module is incorrect. For example, an input that is determined to be syntactically correct but cannot be processed by the entire system upon performing speech recognition is disadvantageously received, and returns as an error. That is, a speech recognition unit and the whole system separately perform processing without operating together, thereby failing to implement complicated processing. As a consequence, the performance of the entire system is seriously influenced by the result of speech recognition.

SUMMARY OF THE INVENTION

Accordingly, it is an object of the present invention to provide an information processing apparatus and an information processing method for improving the speech recognition rate.

It is another object of the present invention to provide an information processing apparatus and an information processing method for performing speech recognition without being dependent upon a syntax structure.

In order to achieve the above objects, according to one aspect of the present invention, there is provided an information processing apparatus including a storage unit for storing prediction information concerning an object to be recognized. A recognition unit recognizes sound information based on the prediction information. A knowledge base stores knowledge concerning the type of data represented by the sound information. A prediction unit predicts sound information which is to be subsequently recognized by the recognition unit by referring to the knowledge stored in the knowledge base. An updating unit updates the prediction information stored in the storage unit based on a prediction result obtained by the prediction unit.

According to another aspect of the present invention, there is provided an information processing method including a recognition step of recognizing sound information based on prediction information, a prediction step of predicting sound information to be subsequently recognized in the recognition step by checking knowledge stored in a knowledge base for storing knowledge concerning the type of data represented by sound information, and an updating step of updating the prediction information based on a prediction result obtained in the prediction step.

According to still another aspect of the present invention, there is provided a computer-readable storage medium storing a response program for controlling a computer to perform speech recognition. The program includes codes for causing the computer to perform a recognition step of recognizing sound information based on prediction information, a prediction step of predicting sound information to be subsequently recognized in the recognition step by checking knowledge stored in a knowledge base for storing knowledge concerning the type of data represented by sound information, and an updating step of updating the prediction information based on a prediction result obtained in the prediction step.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 14 and 15 illustrate the classification of the categories of words;

FIG. 25 illustrates an example of a syllable dictionary;

FIG. 26 illustrates an example of a word dictionary;

FIG. 29 illustrates an example of a language dictionary;

FIG. 30 illustrates an example of a concept dictionary;

FIG. 31 illustrates an example of rules;

FIG. 32 illustrates an example of a word dictionary;

FIG. 33 illustrates an example of syllable recognition results;

FIG. 35 illustrates an example of a word dictionary;

FIG. 36 illustrates an example of syllable recognition results;

DESCRIPTION OF THE PREFERRED EMBODIMENTS

Preferred embodiments of the present invention are described in detail below with reference to the accompanying drawings.

First Embodiment

A detailed description is given below of a first embodiment of the present invention with reference to the drawings.

Figure 1:
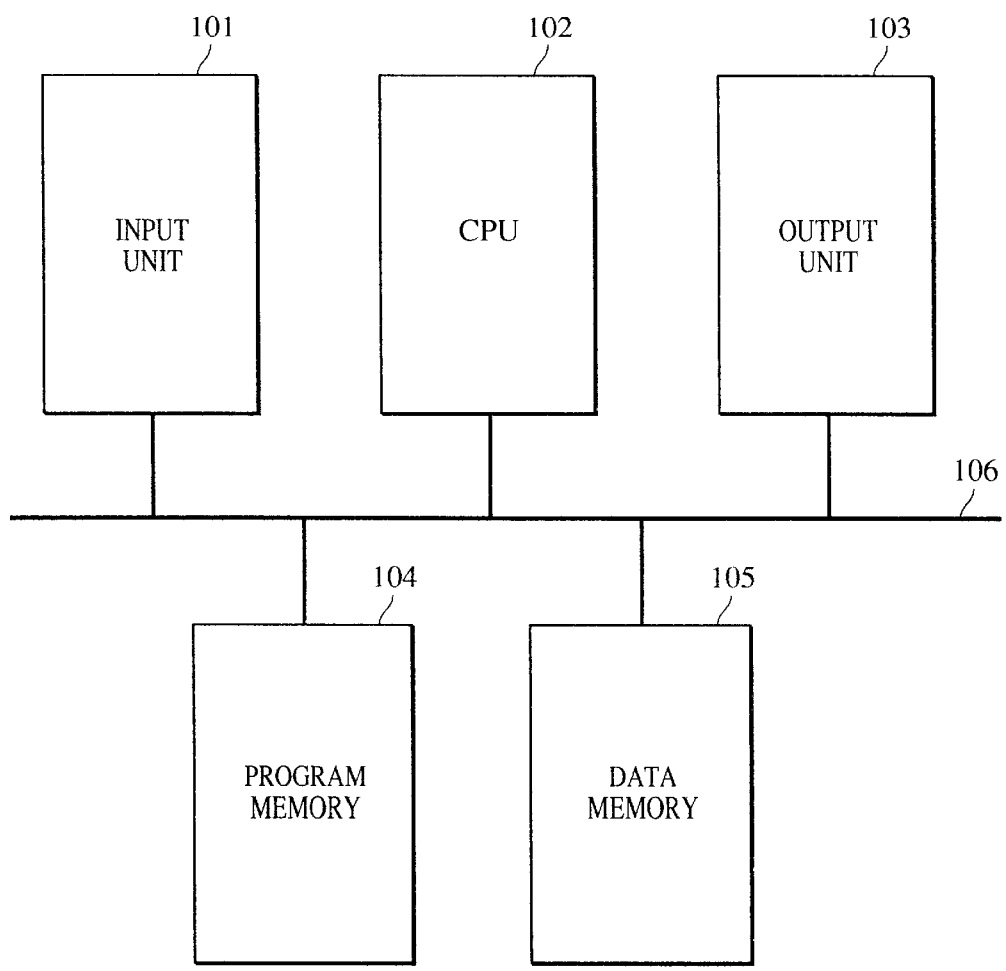
FIG. 1 illustrates the configuration of hardware of a natural-language processing apparatus according to an embodiment of the present invention.

A discussion is first given of the construction of the hardware for use in a natural-language processing apparatus according to the first embodiment of the present invention. Referring to the block diagram illustrating the construction of the hardware shown in FIG. 1, an input unit 101 inputs information through the use of a natural language. It is not essential that the input information be a grammatically complete sentence as long as it has a regular structure.

The input unit 101 is not limited to a speech recognition system for inputting and recognizing speech, and may be a keyboard for inputting characters through keys, a character recognition reader for optically reading characters from a document and recognizing them, an online/offline handwritten-character recognition reader, or a receiving unit for receiving information from another system, for example, from a character recognition system. Alternatively, two of the above input units may be combined and selectively utilized as the input unit 101.

A CPU 102 conducts calculations and Boolean operations for various processing, and controls the individual elements connected to a bus 106. An output unit 103 outputs analyzed data information, and may be a speech synthesizing unit for synthesizing speech from character information and outputting it, a display unit, such as a cathode ray tube (CRT) or a liquid crystal display unit, a printer for printing characters on a document, or a transmitter for transmitting information to another unit, such as a database. The output from the output unit 103 may be input into another output unit within the same apparatus, for example into a concept analyzing unit. Alternatively, two of the above-described units may be combined and selectively utilized as the output unit 103.

A program memory 104 stores a program including the processing procedure controlled by the CPU 102, which will be described below with reference to a flow chart. The program memory 104 may be a read only memory (ROM) or a random access memory (RAM) into which the program is loaded from an external storage device.

A data memory 105 stores not only data generated by various processing, but also a knowledge base, which will be discussed below. The data memory 105 may be a RAM, but knowledge included in the knowledge base is loaded into the data memory 105 from a non-volatile external storage medium before processing is executed, or is checked every time the need arises. The bus 106 is used for transmitting address signals which give an instruction to the individual elements controlled by the CPU 102 and for transferring data to be exchanged between the individual units.

Figure 2:
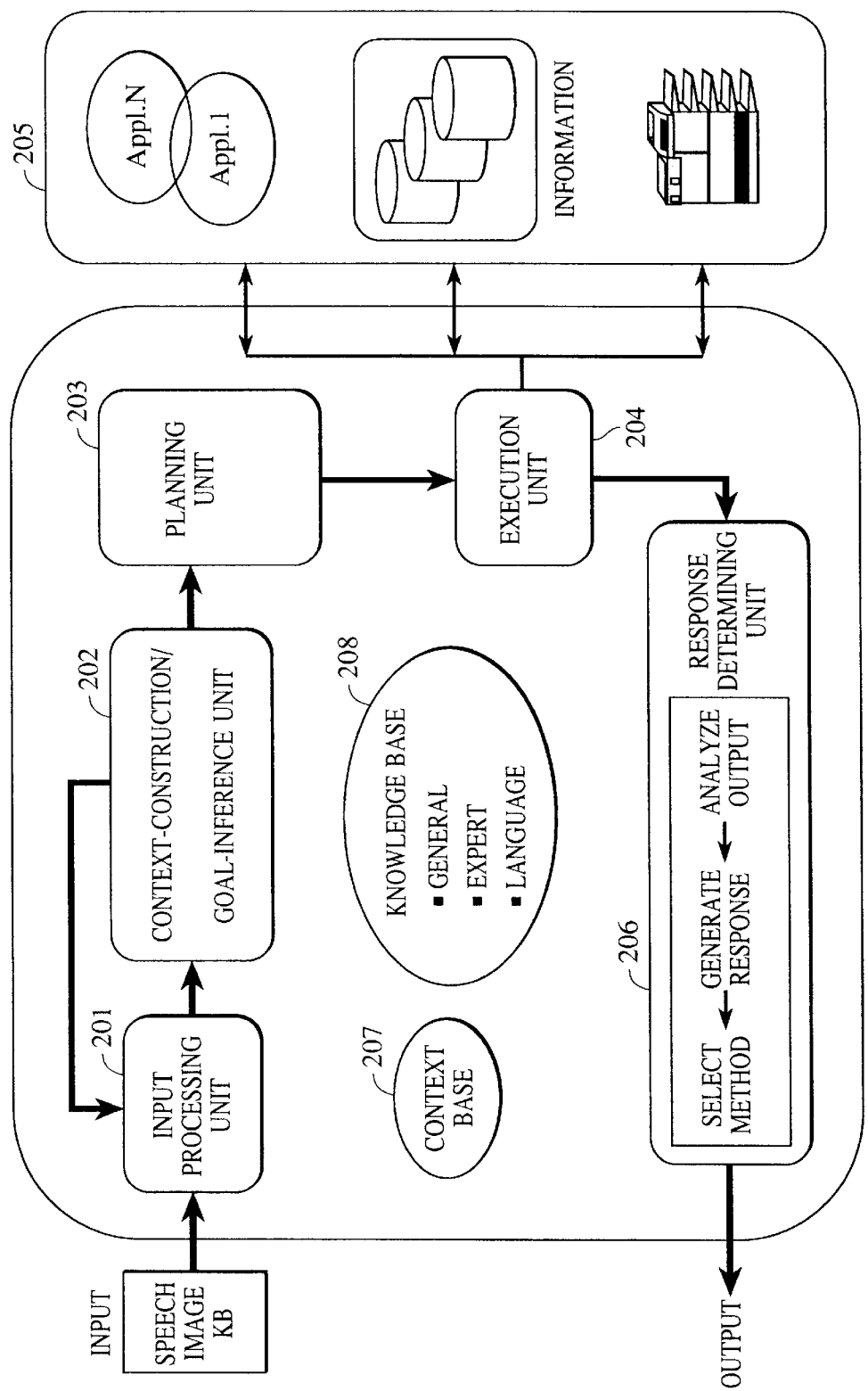
FIG. 2 illustrates the system architecture.

FIG. 2 is a block diagram illustrating the basic configuration of an information processing apparatus according to the first embodiment. The information processing apparatus performs processing by using knowledge of the knowledge base. FIG. 2 illustrates the flow of the processing executed by using this knowledge.

The information processing apparatus includes an input processing unit 201 for executing processing on the individual input signals so as to obtain input information. A context-construction/goal-inference unit 202 conducts concept-analyses on the content of natural-language information input from the input unit 101 by utilizing the knowledge of a knowledge base 208, thereby understanding the meaning of the words.

A planning unit 203 performs planning by using a context base 207 and the knowledge of the knowledge base 208 in order to achieve a goal inferred by the context construction/goal-inference unit 202.

An execution unit 204 requests, based on the processing result of the planning unit 203, a main application unit 205 to execute processing by using an application, a database, or a printer connected to a system. The main application unit 205 then executes processing by using an application, database, or a printer connected to the system.

A response determining unit 206 receives the processing result of the execution unit 204 and determines a response to be output to a user. In this embodiment, the response determining unit 206 analyzes the output by employing the context base 207 and the knowledge of the knowledge base 208 and generates a response if required, and finally selects a method for outputting the response.

The context base 207 provides the knowledge required for the context-construction/goal-inference unit 202, the planning unit 203, and the response determining unit 206, and also stores new knowledge generated while the above units are executing processing.

The knowledge base 208 provides the knowledge required for the context-construction/goal-inference unit 202, the planning unit 203, and the response determining unit 206, and also stores new knowledge produced while the above units are executing processing.

Figure 3:
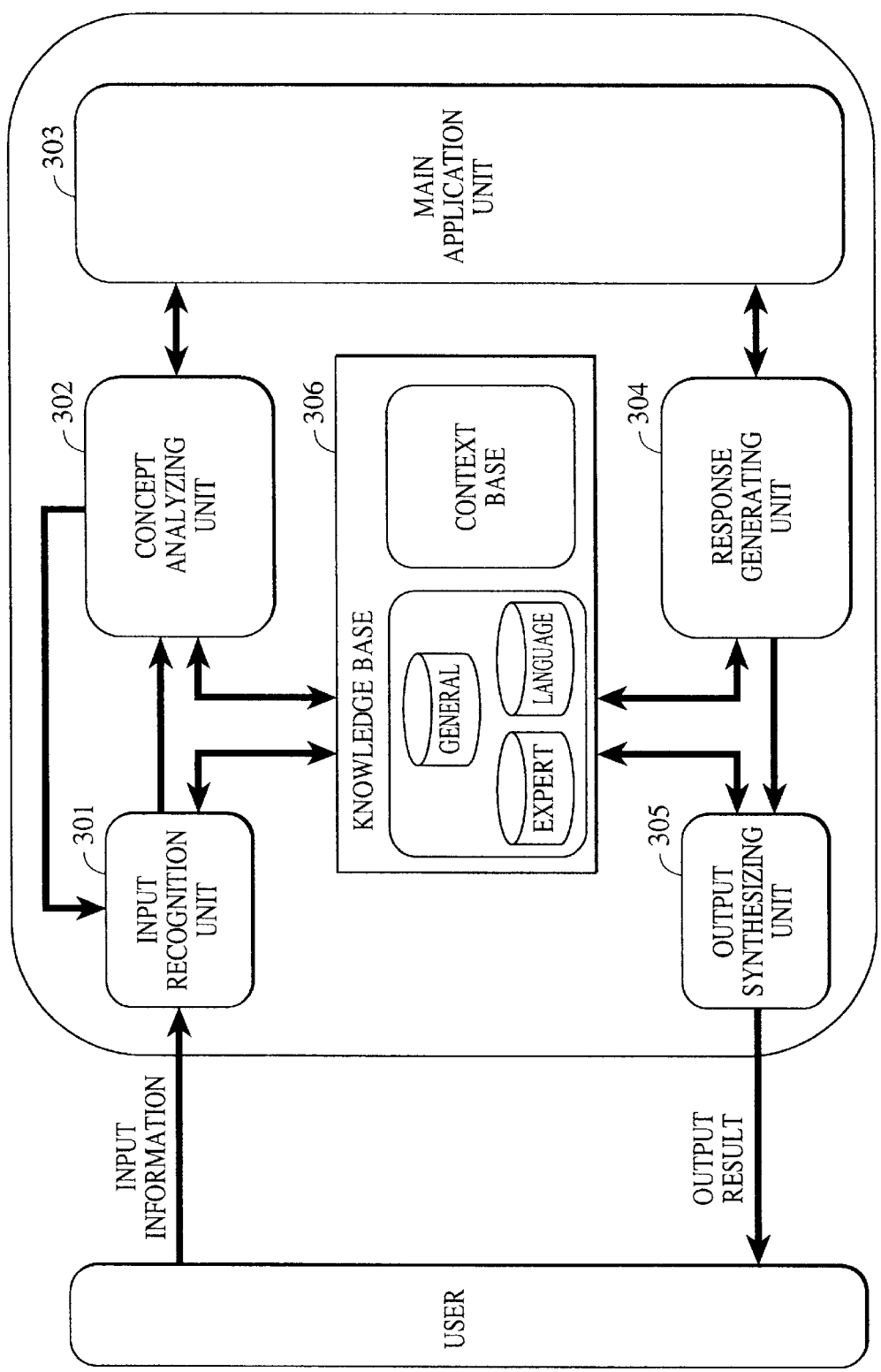
FIG. 3 illustrates an implementation mode in speech recognition.

FIG. 3 illustrates the flow of the processing performed by the information processing apparatus of the first embodiment. An input recognition unit 301, which corresponds to the input processing unit 201 shown in FIG. 2, recognizes the input information.

A concept analyzing unit 302, which corresponds to the context-construction/goal-inference unit 202, the planning unit 203, and the execution unit 204, analyzes the meaning of the input information by utilizing knowledge-base/context-base 306 contained in the system according to the recognition result of the input recognition unit 301. Upon analyses, the concept analyzing unit 302 predicts information to be subsequently input or requests a main application unit 303 to execute processing.

The main application unit 303, which corresponds to the main application unit 205, executes processing requested by the concept analyzing unit 302 and transfers the execution result to a response generating unit 304.

The response generating unit 304, which performs processing on the result of the response determining unit 206, analyzes the execution result of the main application unit 303 and generates a response to be output to the user, and also selects the optimal output method.

The response generating unit 304 requests an output synthesizing unit 305 to output the response. The output synthesizing unit 305 outputs the response generated by the response generating unit 304 according to the selected method. The knowledge-base/context-base 306 of the system is used for performing processing by the response generating unit 304 and the output synthesizing unit 305.

By applying the construction of the information processing apparatus of the first embodiment to speech recognition, the advantages of human speech recognition processing are implemented in this apparatus. An example of a mechanism of recognizing speech issued by humans is given below. In this example, it is assumed that input speech "Send mail to May" is processed.

Figure 4:
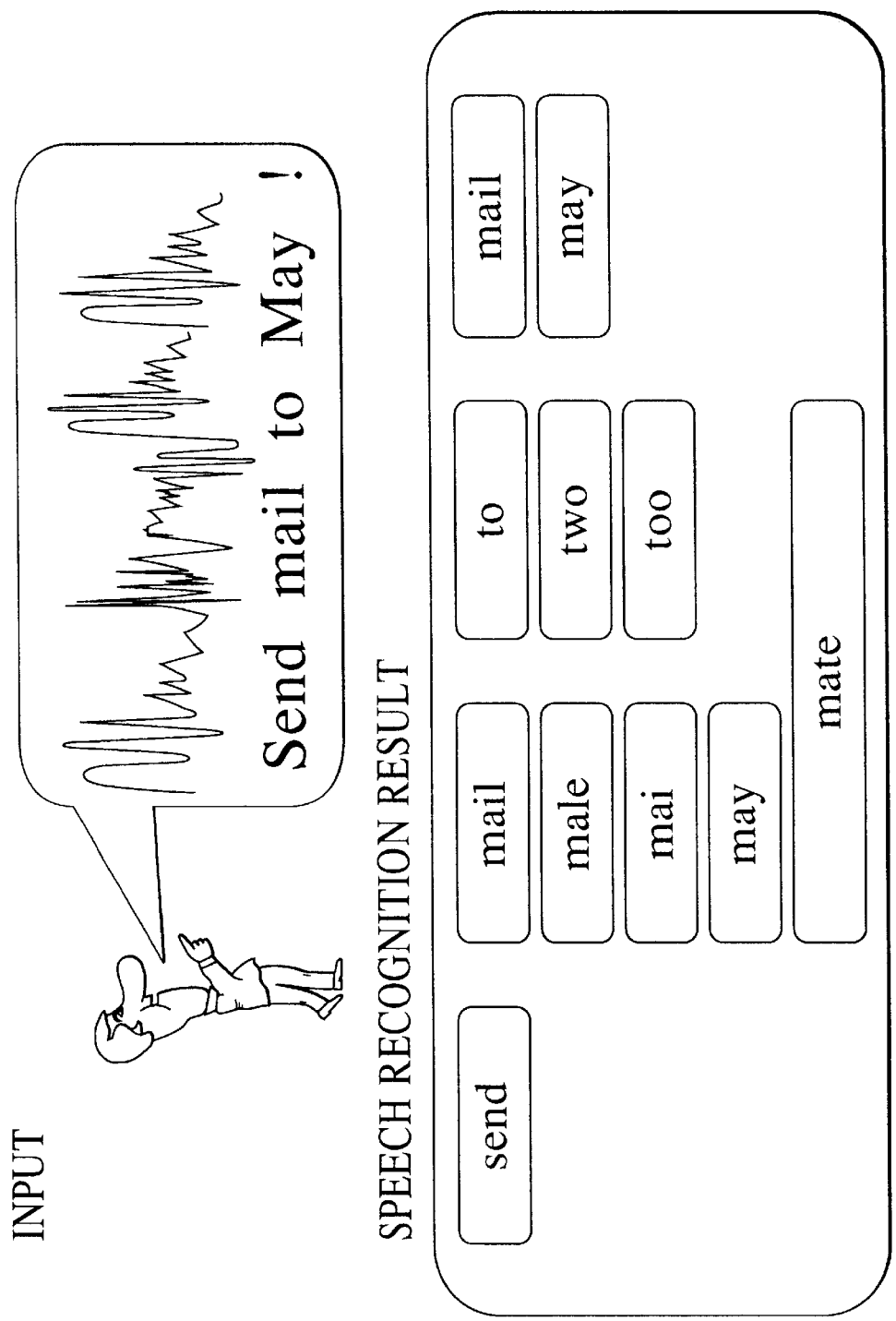
FIG. 4 illustrates the outline of understanding speech issued by humans.

FIG. 4 illustrates the outline of understanding the speech "Send mail to May" by humans. In most cases, humans recognize the speech by understanding it as one meaning rather than by sequentially selecting possible words similar to a certain portion of the input speech waveform, as performed in current speech recognition systems. This is because humans recognize and understand speech not only by speech information, but also by predicting the context used before and after the speech and common sense to some extent.

In order to implement the humans' recognition operation in a system, predictions may be made on the input information in advance. More specifically, when "Send mail to May!" is input as speech, the following predictions are made. Upon recognizing the word "send", the subsequent object is predicted by using the language knowledge, and a word "mail" is further predicted by using the domain knowledge.

Generally, in speech recognition, possible words "male", "mai", "may", and "mate" may be searched for. Among these words, "mai" may be predicted as a personal name from the language knowledge, which is unlikely to be contained in an ordinary dictionary. However, since personal names are not likely to come immediately after "send", "mai" is rejected. Also, a stereotyped phrase "send to" is predicted from the language knowledge, and "mate" is not likely to be selected. Further, "too", which is a homonym of "to", is not predicted from the knowledge base. Finally, it is predicted from the concept knowledge that XXX in "send to XXX" may be an object, and from the domain knowledge that the destination of "send to" may be a human (personal name). It is thus considered that "May" be predicted from an address book or a biographical dictionary.

Figure 42:
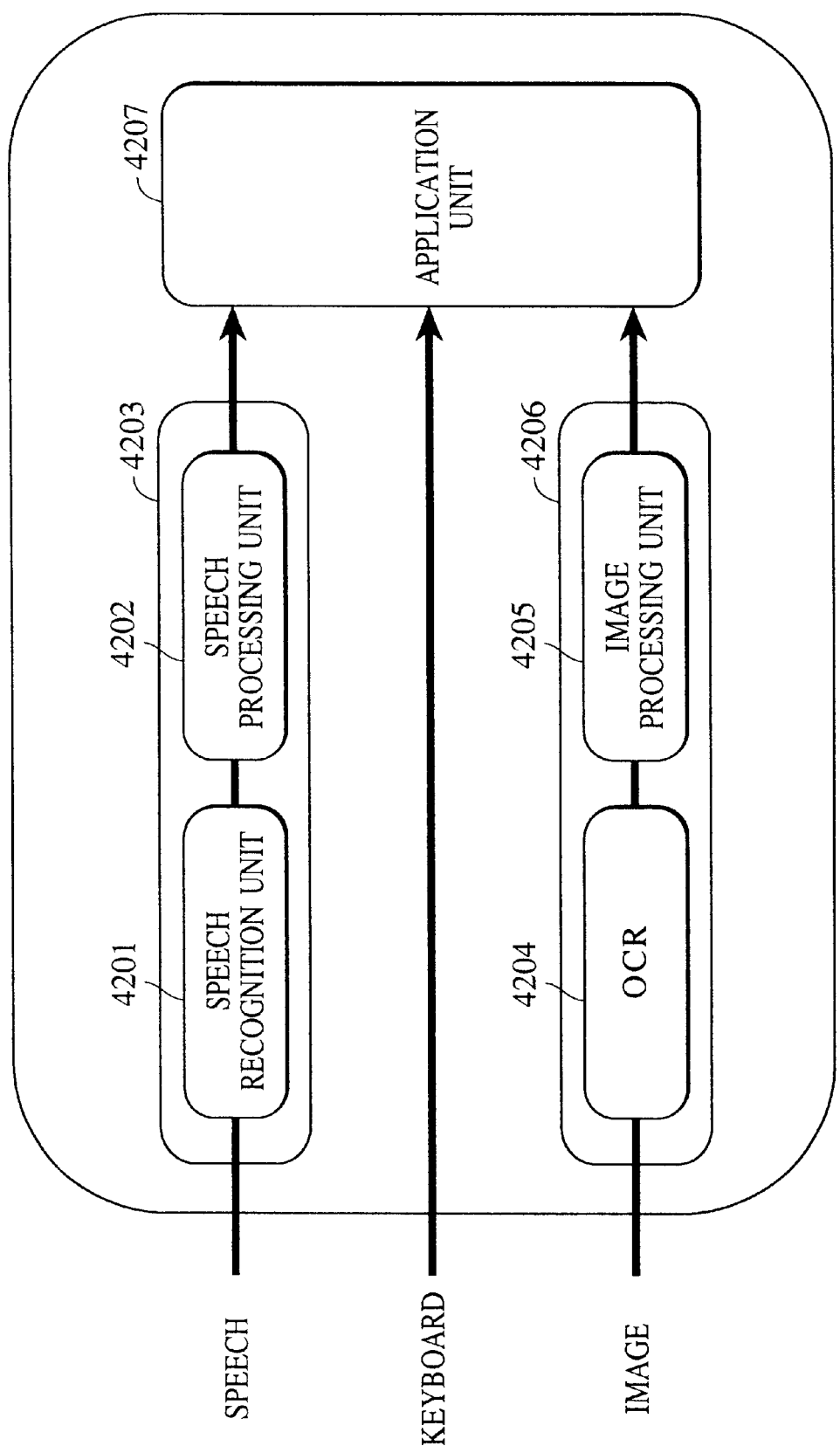
FIG. 42 illustrates conventional input processing.

A comparison is then made between the speech recognition processing shown in FIG. 4 and the processing performed by the conventional speech recognition system shown in FIG. 42.

According to conventional input processing methods, various determinations are generally made in a recognition module, and the result is transferred to another module. The input information is recognized by executing the recognition processing and is shaped into a form receivable by an application. The flow of the processing is unidirectional, and the individual units separately perform the processing rather than operating together.

Particularly for the processing of input speech, the following method is usually employed, as illustrated in FIG. 42. The result obtained by recognizing the speech in a speech recognition unit 4201 is uniquely determined as a system command by being filtered (parsed) in a speech processing unit 4202. Not only processing for grammatically correct speech, but also processing for unnecessary words, such as exclamations and restated words, and for non grammatical speech, such as anastrophy (inversion) and particle dropping is handled by language processing (verifying such words against a word database or a grammar database) in the speech processing unit 4202. Parsing is performed in order to analyze the structure of syntax, and accordingly, elements other than syntax information, which may also be useful, are rejected. Additionally, the flow of the processing is unidirectional, and even if the processing result of the speech recognition module is incorrect, the system completes the processing performed by a speech input unit 4203 and proceeds to a subsequent stage, i.e., an application unit 4207. Processing is similarly performed on a keyboard input and an image input unit 4206 (an optical character reader (OCR) 4204 and an image processing unit 4205).

According to the aforementioned method, even an input which cannot be processed by the entire system is accepted, and is returned as an error from the application unit 4207. That is, the processing on speech and images performed by the input units 4203 and 4206 does not operate together with the processing of the entire system, thereby implementing merely a simple operation. As a result, the performance of the entire system is seriously influenced by the result of speech recognition.

Figure 5:
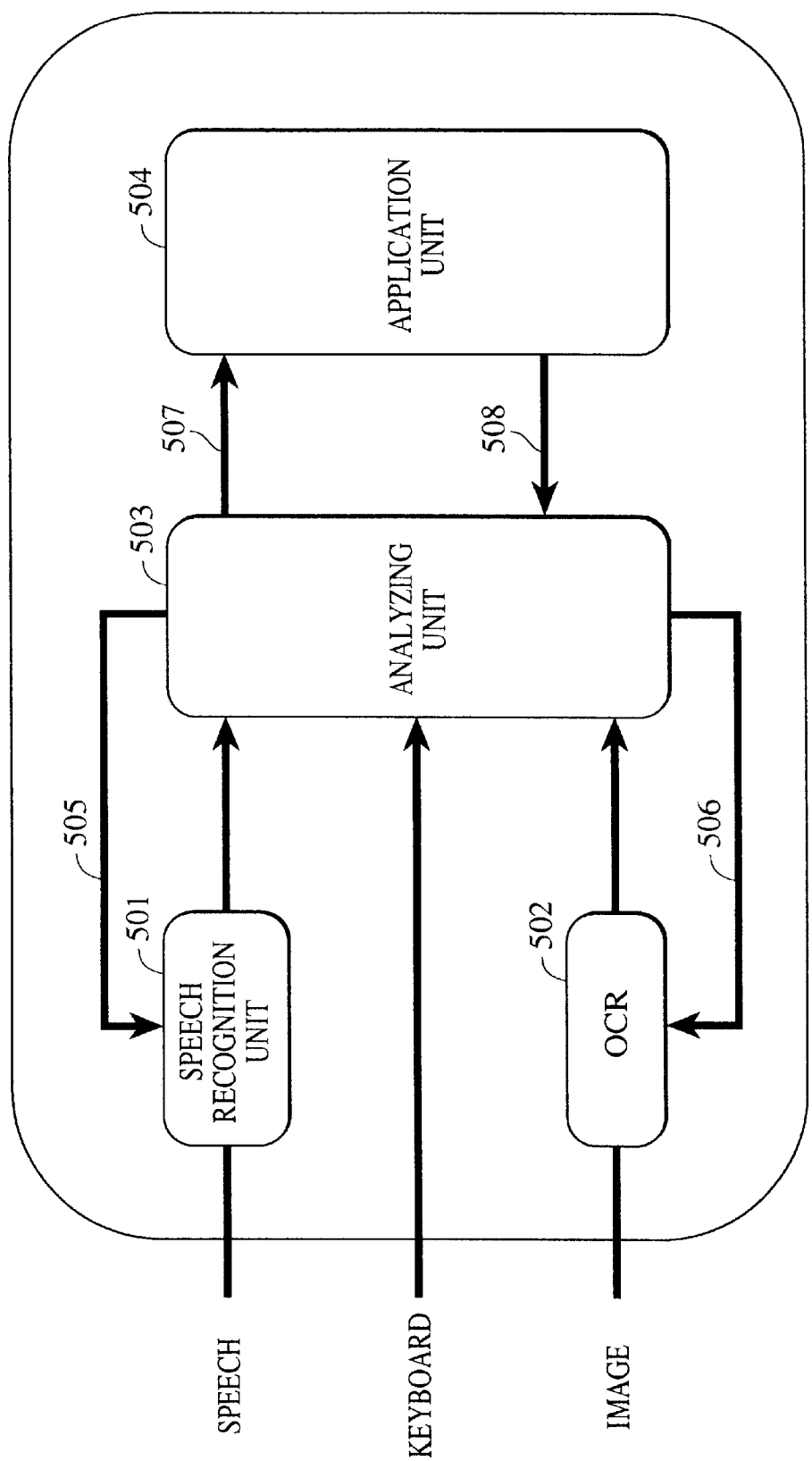
FIG. 5 illustrates input processing.

In contrast, an input processing method according to the first embodiment is shown in FIG. 5. Input information, if it indicates sound, is recognized in a speech recognition unit 501, and if it represents an image, is recognized in an OCR 502. The result is then analyzed in an analyzing unit 503 based on common sense and knowledge, and a subsequent input is further predicted or the result of analyses is transferred to an application unit 504 of the system.

Particularly for processing input speech, the speech recognition is ideally performed by comprehensively using speech information and other knowledge rather than solely performing speech recognition as in a conventional manner. The result obtained by processing speech is stored as the knowledge of the whole system, and is used together with the other knowledge included in the system, thereby making it possible to recognize the meaning of the speech rather than the structure of the speech. That is, according to the flow of the processing indicated by the arrows 505 and 506 shown in FIG. 5, the results of analyses are fed back to the speech recognition unit 501 and the OCR 502 so that the recognition result and the analyses results operate together, thereby improving the performance of the input processing. According to the flow of the processing indicated by the arrows 507 and 508 illustrated in FIG. 5, the analysis result and the processing of the application unit 504 operate together, thereby enhancing the performance of execution processing. As a consequence, the performance of the entire system can be improved.

Figure 6:
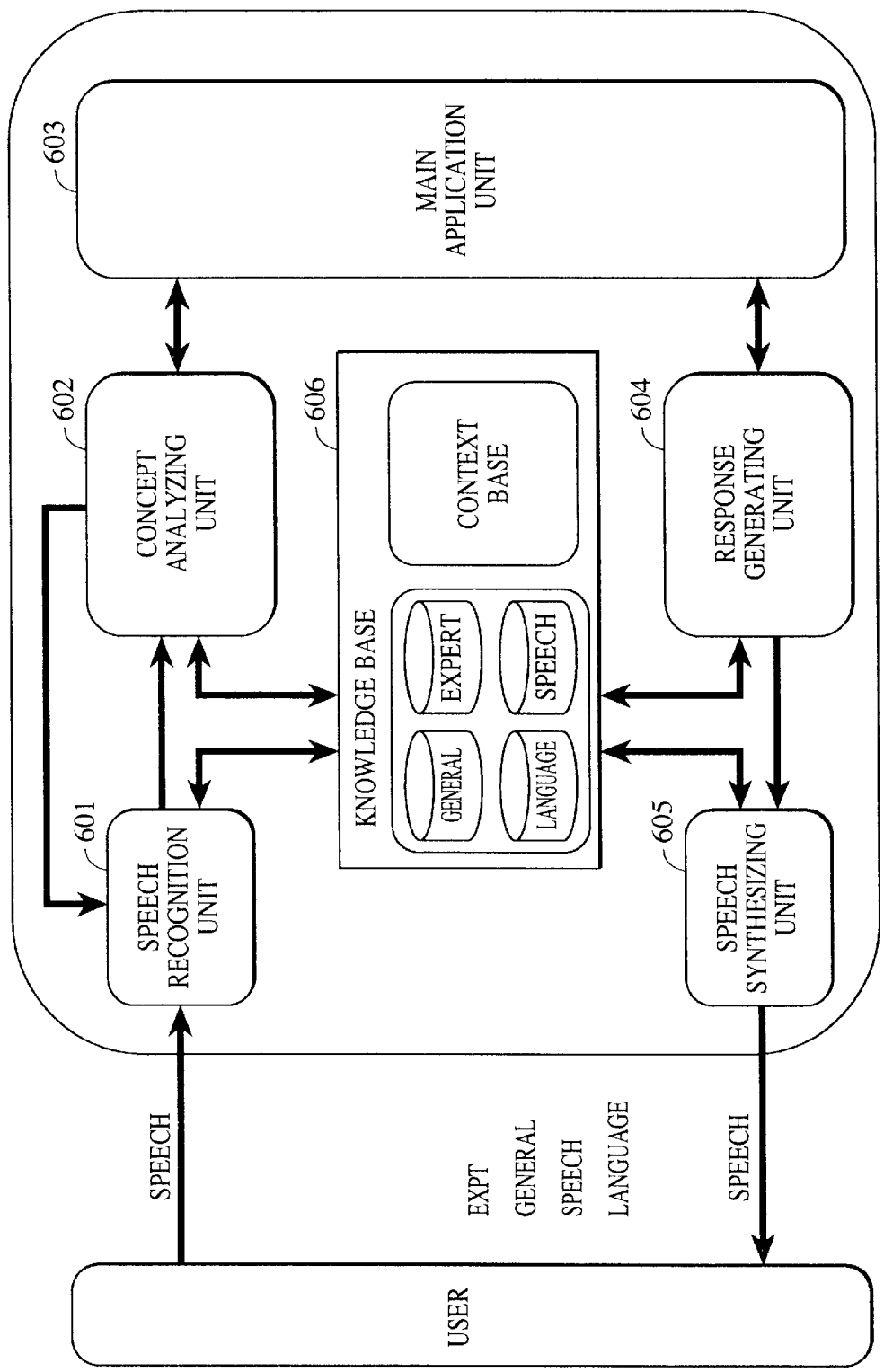
FIG. 6 illustrates the configuration of a system.

In this embodiment, the input processing illustrated in FIG. 5 and the system architecture shown in FIG. 2 are implemented. As a result, processing similar to the speech recognition processing performed by humans can be achieved. More specifically, FIG. 6 is an overall diagram illustrating a speech recognition system constructed in accordance with an implementing method, such as that shown in FIG. 3.

When speech is input, speech recognition is conducted by a speech recognition unit 601 according to the previously made predictions and information contained in a knowledge-base/context-base 606. For the processing of speech information, the knowledge-base/context-base 606 includes not only common knowledge effective for the processing regardless of the type of knowledge, but also knowledge concerning speech information. The concept of the recognition result is analyzed by a concept analyzing unit 602 by utilizing the common sense and the knowledge of the system contained in the knowledge-base/context-base 606, thereby analyzing the meaning of the recognition result.

A main application unit 603 predicts a subsequent speech input or performs processing according to the purpose. Upon executing the processing by the main application unit 603, a response to the user may be required, in which case, a response is generated in a response generating unit 604. If it is determined that a response is most suitably given to the user in speech, a response is converted into speech in a speech synthesizing unit 605 and is output. The knowledge-base/context-base 606 of the system is also used for the above processing.

Figure 13:
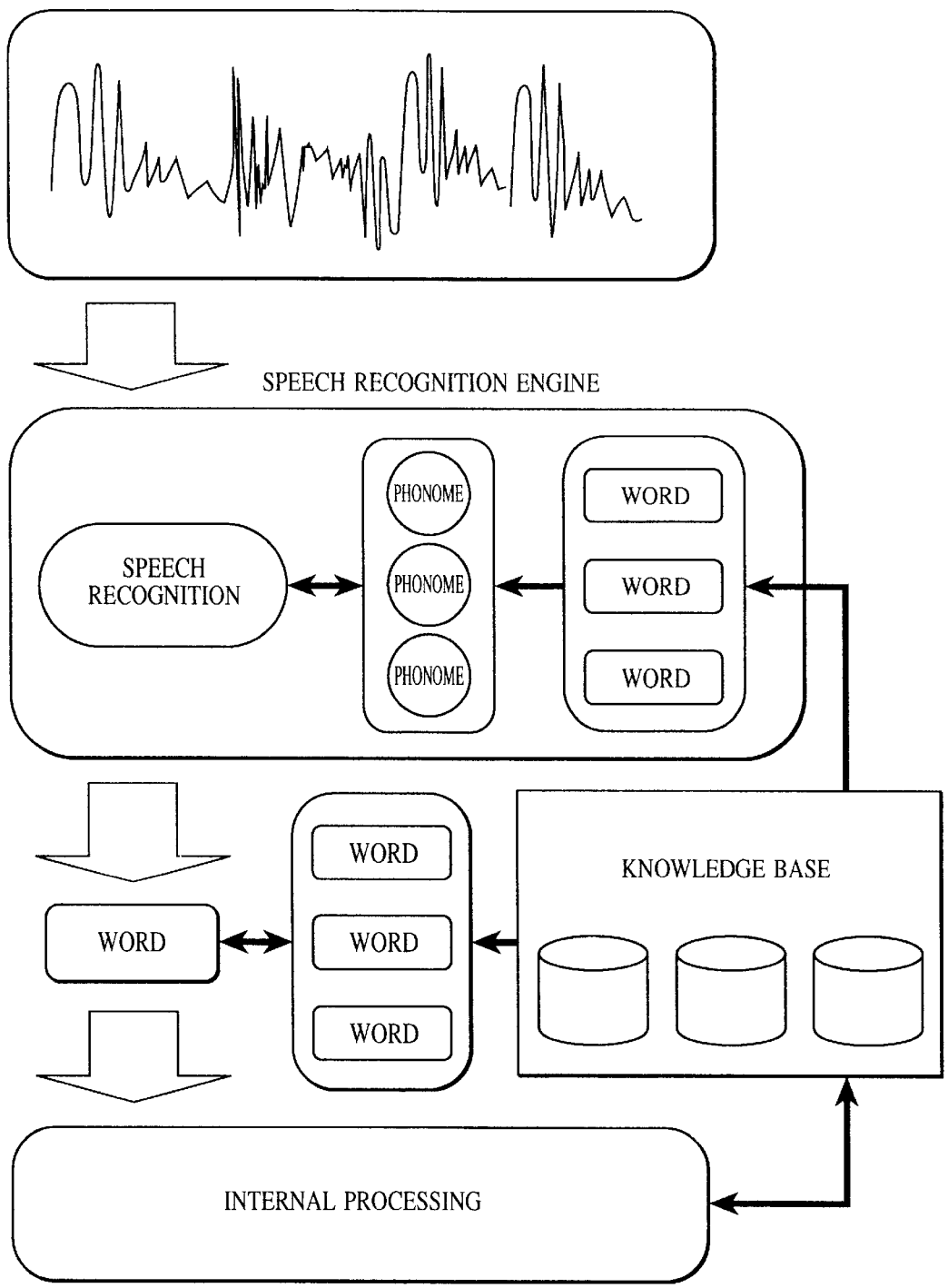
FIG. 13 illustrates two prediction techniques.

There are primarily two techniques for predicting speech, and the details are shown in FIG. 13. Predictions may be made at two stages. When speech is recognized, a subsequent input signal may be predicted. Alternatively, when the output result of a speech recognition engine is used for internal processing, a result to be subsequently input may be predicted.

According to the first technique, a word to be subsequently input is predicted from previously input words and common sense by utilizing a knowledge base. Speech (phonemes or syllables) to be subsequently input is further predicted from the predicted word, and is utilized for enhancing the speech recognition rate. According to the second technique, a word to be subsequently input is also predicted from previously input speech and common sense by utilizing the knowledge base, and is used for smoothly performing subsequent processing.

Figure 27:
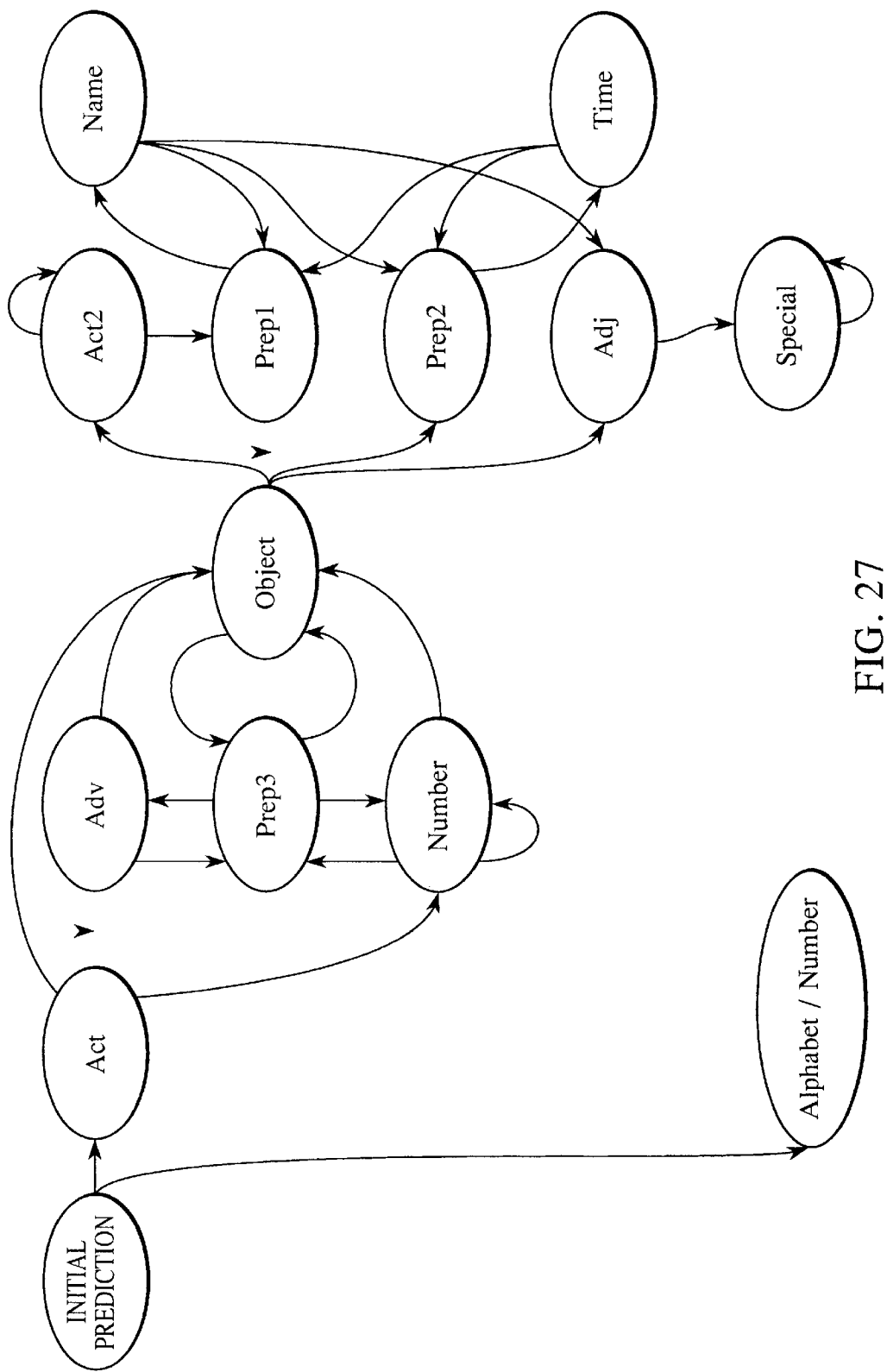
FIG. 27 illustrates the state transition of the context for a prediction of a subsequent input.

For example, if a domain represents an apparatus for transmitting documents or mail, the state transition of the context illustrated in FIG. 27 is predicted. An initial prediction is made in the apparatus as follows. First, a prediction is made from the general knowledge, such as "a user may take some action in order to operate the apparatus", that a verb is likely to be input. Then, verbs that may be accepted by this apparatus are categorized as Act, and the apparatus waits for an input of speech by predicting that a verb belonging to the category Act is to be input.

After recognizing the input of a verb belonging to the category Act, the state transition of the prediction category occurs. That is, a prediction is then made on speech belonging to the category Object. The classification of the categories, such as Act and Object, is shown in, for example, FIGS. 14 and 15. For example, the category Object handled in this apparatus includes mail, document, etc.

Figure 8:
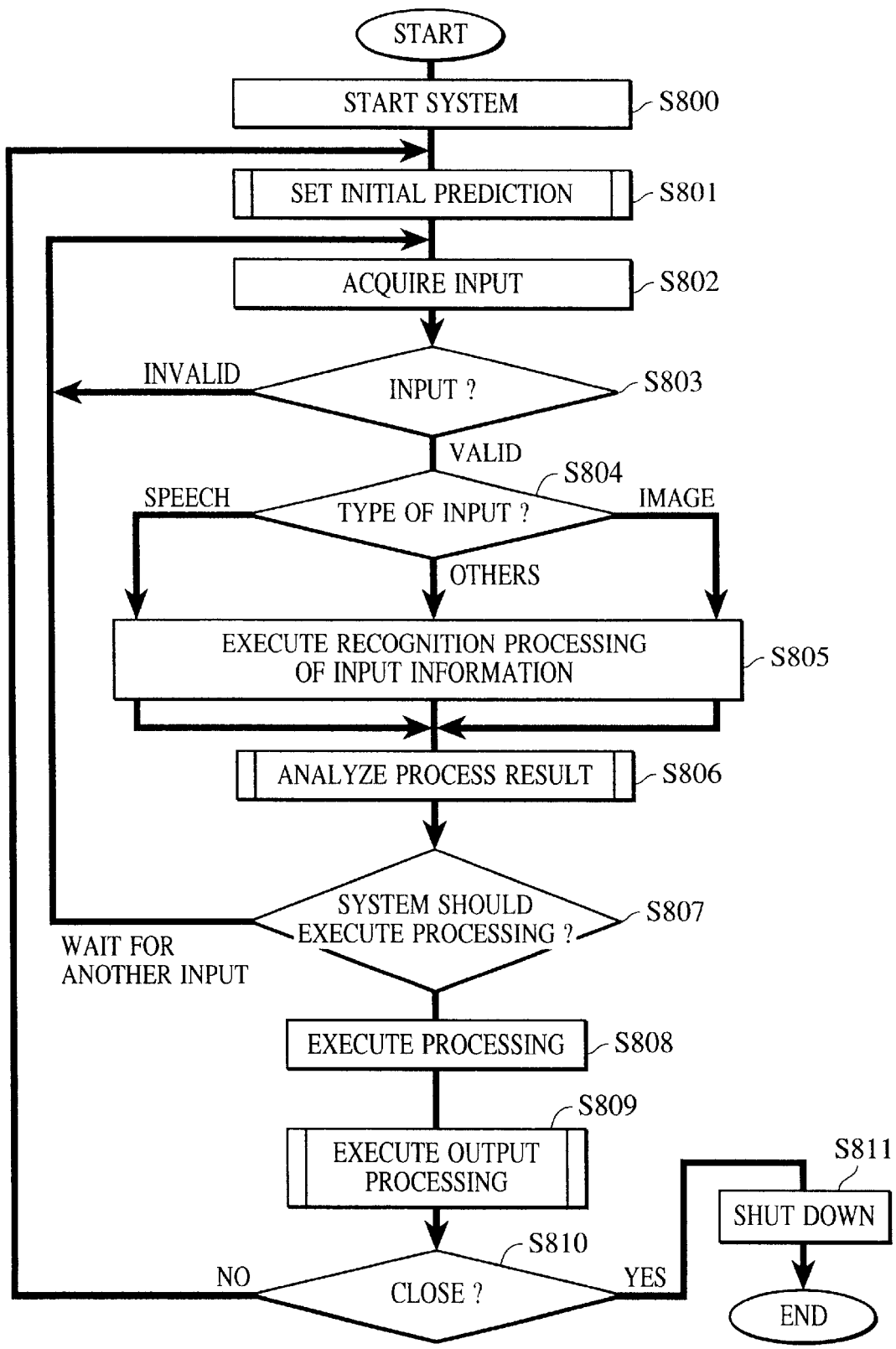
FIG. 8 is a flow chart schematically illustrating the processing performed by the entire apparatus.

FIG. 8 is a flow chart schematically illustrating the processing performed by the entire apparatus. A subsequent object to be recognized is predicted based on a knowledge base storing information concerning knowledge.

Figure 16:
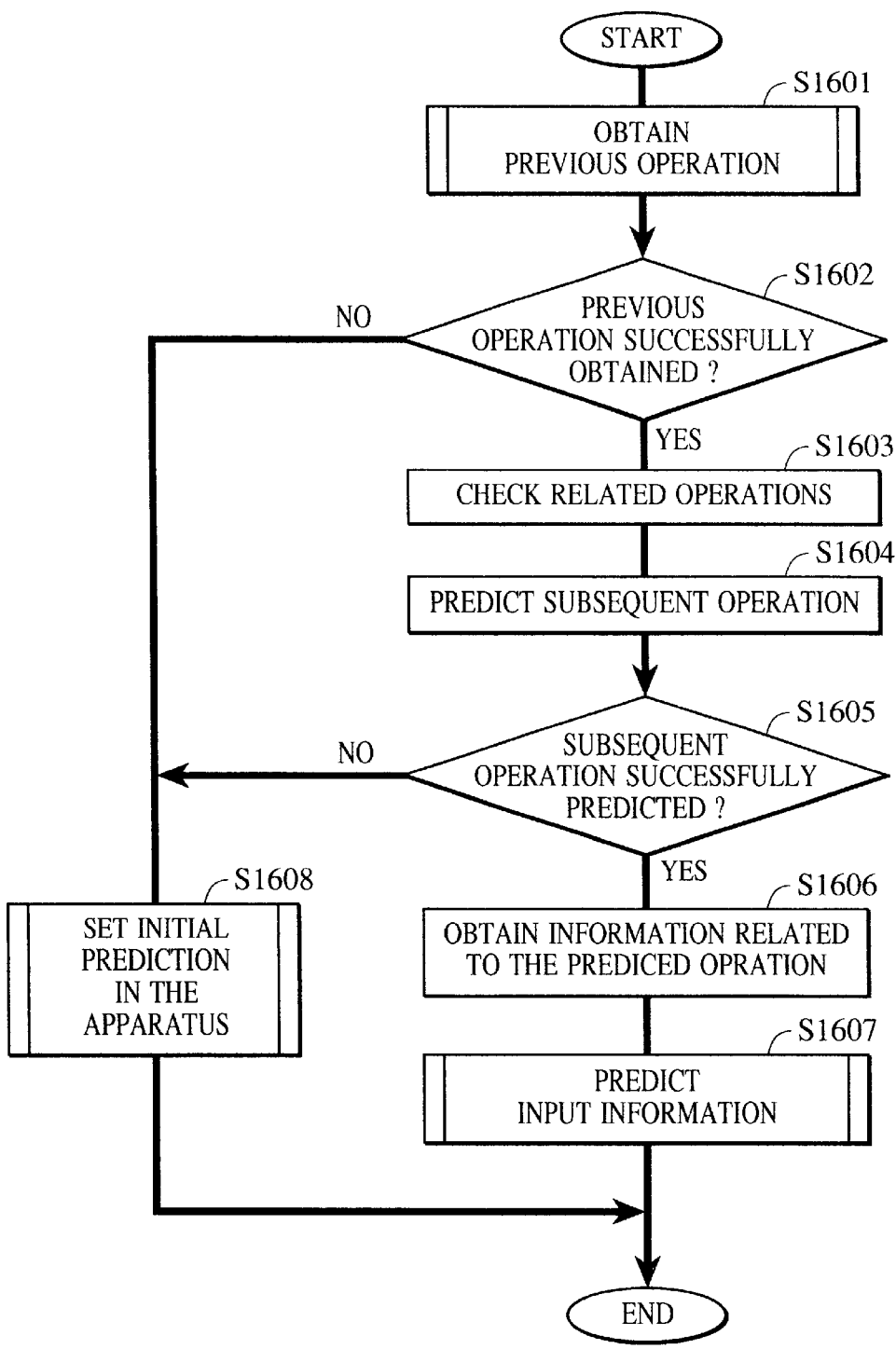
FIG. 16 is a flow chart illustrating the procedure of setting the initial prediction.

In step S800, the system is started. Then, in step S801, an initial prediction is set. FIG. 16 is a flow chart illustrating the procedure of setting the initial prediction. In setting the initial prediction, since information to be recognized has not yet been input, a subsequent operation is predicted based on the previous operation, and input information is predicted based on the predicted operation.

In step S1601, the previous operation is obtained by referring to the previous processing state of the system or the content of the user's request. If it is found in step S1602 that the previous operation cannot be obtained due to the absence of a previous operation, which state is encountered immediately after the system has just started, the flow proceeds to step S1608 in which an initial prediction is set in the apparatus. In this flow chart, it is determined in step S1608 that the user must request the apparatus to take some Action, and verbs are activated as a context to be recognized by the speech recognition system.

On the other hand, if it is determined in step S1602 that the previous operation has been successfully obtained, the flow proceeds to step S1603 in which the operations related to the previous operation are checked by referring to the general knowledge or the domain knowledge related to the apparatus contained in the knowledge base. Then, in step S1604, among the operations checked in step S1603, the operation which is most likely to be performed is predicted. A determination is then made in step S1605 whether the subsequent operation has been successfully predicted. If the outcome of step S1605 is yes, the flow proceeds to step S1606. In step S1606, information related to the predicted operation is acquired from the knowledge base, and in step S1607, information to be input is predicted based on the information acquired in step S1606.

For example, if the previous operation is "print three copies of a document", the operations related to the "printing operation", such as "check print status" and "print another copy", are checked in step S1603 from the knowledge base. Then, in step S1604, it can be predicted from the previous operation "print three copies" that "check print status" is more likely to be input than "print another copy". In step S1606, by referring to the domain knowledge from the operation "check print status", the related information, such as a keyword, for example, "printer status" can be obtained. By using the obtained information, subsequent input information is predicted in step S1607.

If the previous operation is "delete all the jobs", the subsequent operation cannot be obtained in step S1603 and S1604, and the determination of step S1605 becomes no. Then, an initial prediction is set in step S1608.

Referring back to FIG. 8, input information is acquired in step S802, and it is determined in step S803 whether the input information is valid. If it is valid, the process proceeds to step S804 in which the type of input information is determined. The conceivable types of information may be speech, characters, and images. In step S805, the input information is then recognized based on the prediction according to the type of information determined in step S804. More specifically, in step S805, the input information is recognized in the following manner. It is first checked whether the information is language information or non-language information, and if it is language information, the unit of information, such as a syllable or a phoneme, is determined.

Figure 9:
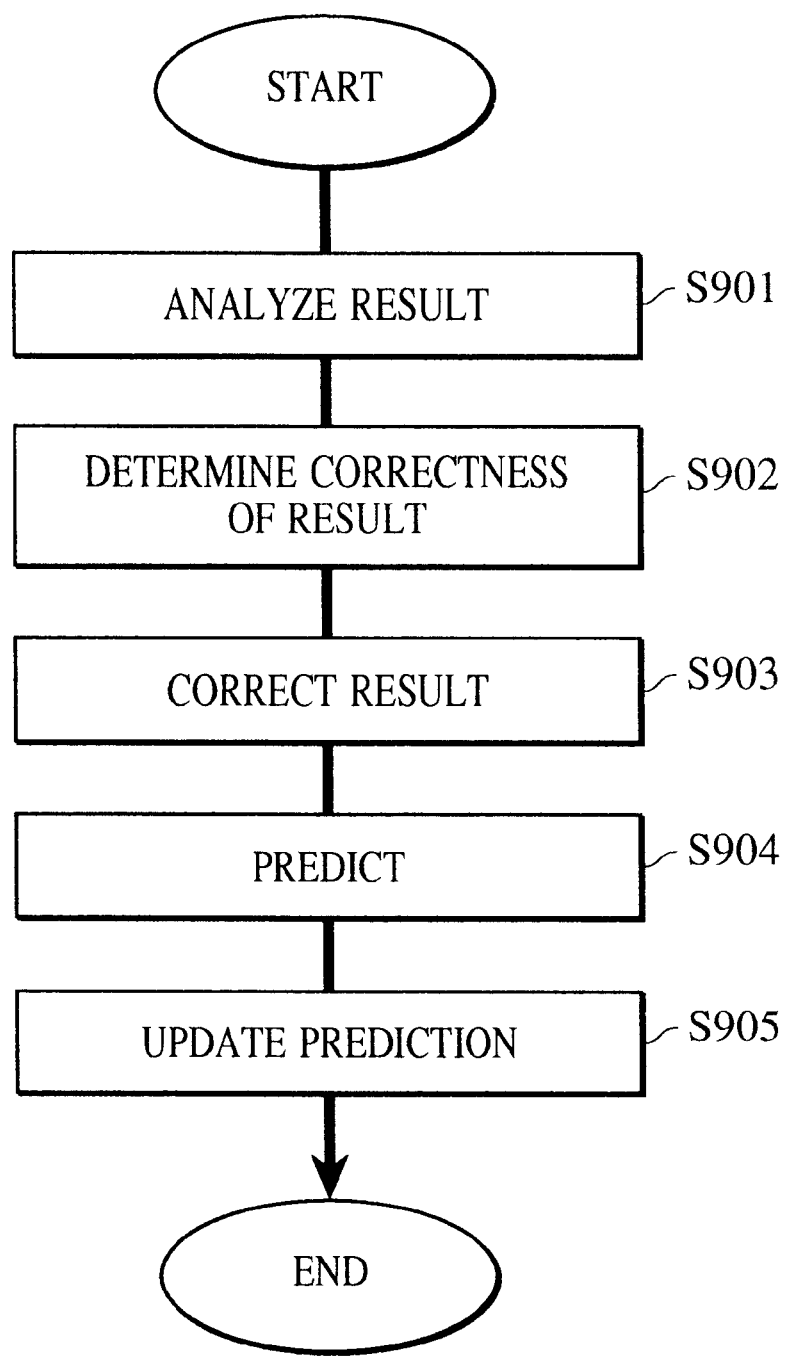
FIG. 9 is a flow chart illustrating an analyzing procedure of the process result.

The recognized result in step S805 is used for predicting subsequent information to be recognized while analyzing the process result in step S806. FIG. 9 is a flow chart illustrating the analyzing procedure of the process result. It is considered that a prediction (step S904) is made not only from the recognition result, but also from an analysis of the recognition result (step S901), a determination of the correctness of the result (step S902), and a correction of the result (step S903). It is not essential that all the processing in steps S901 through S903 be performed. Alternatively, only an analysis of the recognition result or only a correction of the result may be performed. Alternatively, a combination of a determination of the correctness of the result and a correction of the result, or a combination of an analysis of the recognition result and a determination of the correctness of the result may be performed. In step S905, according to the prediction generated in step S904, the prediction is updated for subsequent information to be recognized.

In the whole block of analyzing the recognition result in step S806, processing is executed by referring to various types of knowledge. For example, in utilizing the language knowledge, a general dictionary may be used. Thus, even if "flint" is recognized as an input signal waveform, "print" can be determined upon performing the analyzing processing, since "flint" cannot be found in the general dictionary.

In utilizing the domain knowledge, assuming that the domain is an application provided with a mail sending function, it can be predicted that "mail" is more likely to be input than "male". Also, by utilizing common sense (general knowledge), if, for example, printing was performed as the previous command, it can be predicted that the subsequent operation may be to indicate the printer status.

After advancing the process by using the knowledge, it is determined in step S807 whether the system should execute the processing. For example, upon completing the recognition of an input sentence, if the recognized sentence indicates an instruction to the system to execute the processing, it is determined in step S807 that the corresponding processing should be executed. Then, in step S808, the processing is executed, and in step S809, a response is provided to the user if necessary. If it is determined in step S807 that another input is to be made, the flow returns to step S802 since the prediction for the subsequent input has already been updated. In step S802, the subsequent input is obtained. Upon completing a series of processing, a determination is made in step S810 as to whether the system is to be closed or to be continued. If the system continues to be used, the process returns to step S801 in which an initial prediction is set based on the completed operation. If the system is to be closed, it is shut down in step S811.

Figure 7:
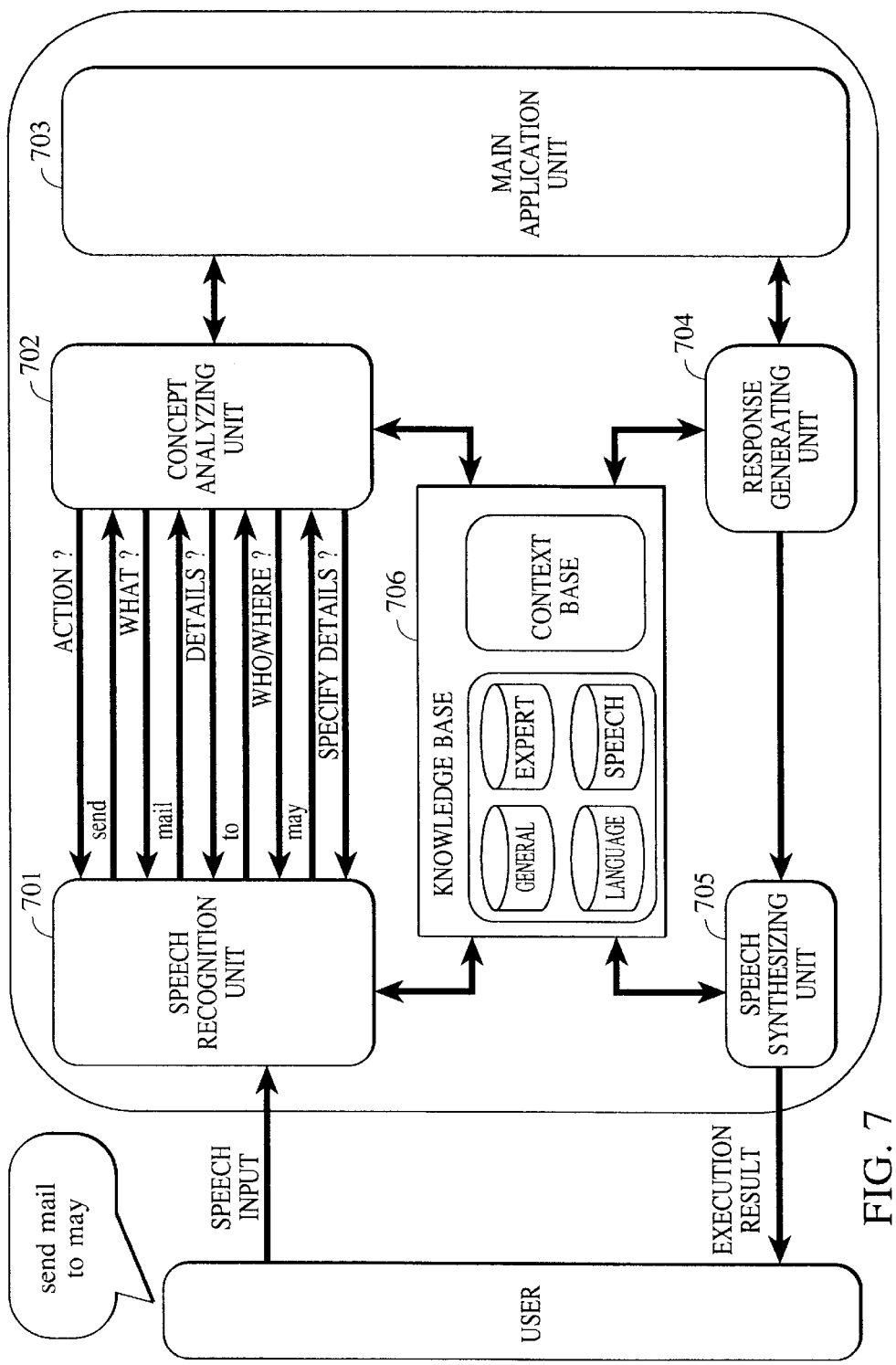
FIG. 7 illustrates a schematic flow of the system processing.

It is now considered in what procedure input speech is actually processed in the speech recognition system of this first embodiment according to the above-described processing illustrated in FIG. 8. The schematic flow of the process of the system in response to user's speech is shown in FIG. 7.

It is first predicted in this type of system that the user may take some action, and the system waits for a verb to be input into the speech recognition unit, since action is usually started with a verb. For example, when "send" is input, it is predicted that an object of "send" is to be input, and the system thus waits for an object to be input.

In this manner, the system understands the words while predicting a word to be subsequently input. If it is determined by conducting concept analyses that the execution is possible, the corresponding processing is actually executed. When it is determined upon the execution result that a response should be returned to the user, a suitable response is generated, and the corresponding sentence is created. The sentence is then output to the user according to the optimal method. If the optimal method is to synthesize speech, the created sentence is converted into speech, which is then output to the user. For example, if mail has been successfully sent to May, a response "I sent mail to may@xxx, Successfully!", is returned.

The processing procedure of the information processing apparatus of this embodiment is discussed below through a specific example.

In this example, input speech "Send mail to May" is recognized by setting a prediction, and the corresponding processing is appropriately performed by conducting concept analyses. It is now assumed that the domain of the apparatus of this embodiment is to send mail or documents by using electronic mail.

The system is started in step S800, and an initial prediction is then set in step S801 for waiting for information to be input from the user. It is determined in step S801 that the user must request the apparatus to take some action, and then, verbs are activated as a context to be recognized by the speech recognition unit. In step S802, the information input by the user is acquired, in which case, the speech issued by the user is recognized, and the speech information is obtained.

A determination is then made in step S803 of whether the speech information is valid in relation to the reference, such as the sound level. If the input is invalid, the system waits for a valid input. If the input is valid, the type of input, in this case, speech, is determined in step S804.

Figure 10:
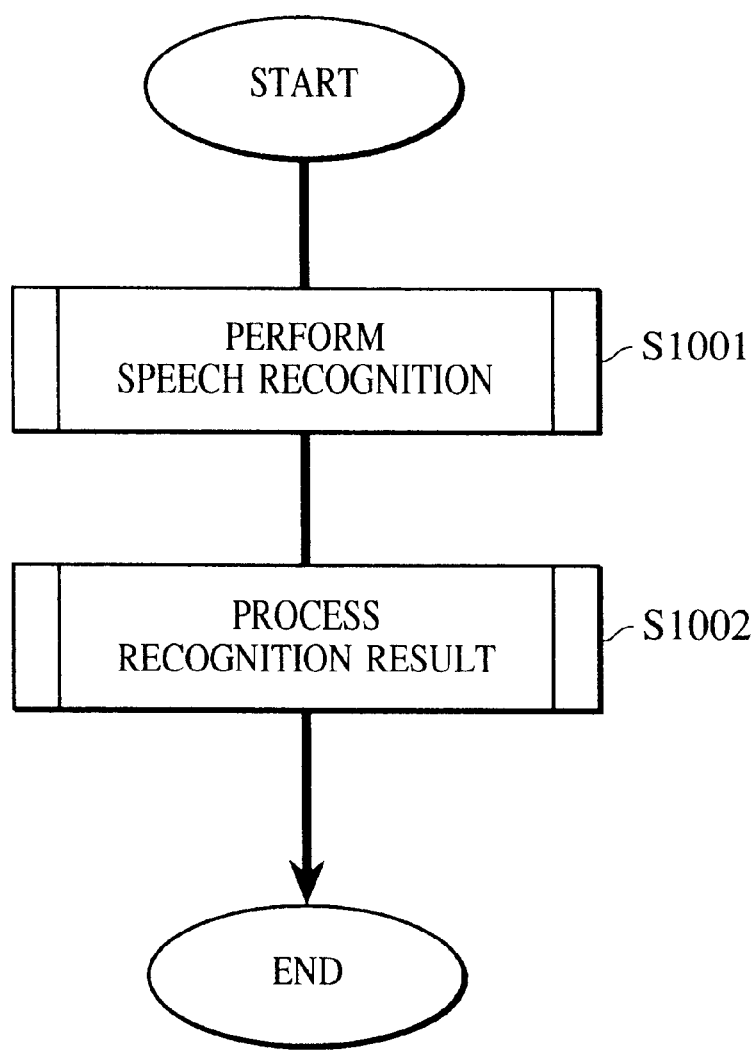
FIG. 10 is a flow chart illustrating the recognition processing reflecting prediction information.

Then, in the recognition processing of the input information in step S805, speech recognition processing shown in FIG. 10 is specifically performed. In step S1001, speech recognition is first conducted. The details are given below with reference to the flow chart of FIG. 11. Upon inputting speech, sound information is first processed in step S1101. Then, it is determined in step S1108 whether the sound information is language information or non-language information. This determination may be made by using a language-information database and a non-language-information database of the knowledge base or by checking the frequency of the sound information.

Figure 12:
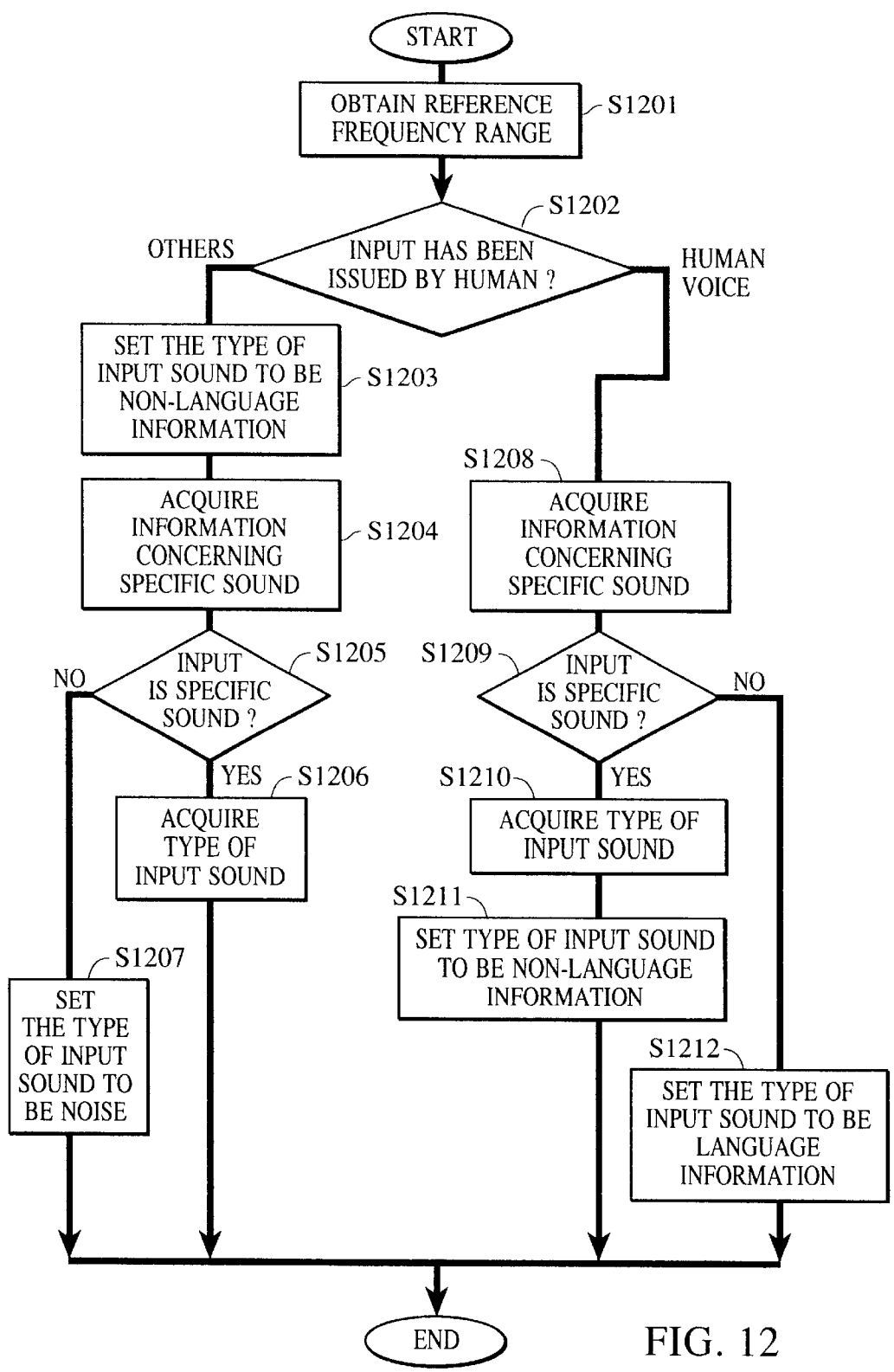
FIG. 12 is a flow chart illustrating the flow of determining the type of input sound.

A specific example of this determination in step S1108 is shown in FIG. 12. In step S1201, a reference frequency range, which is set in the apparatus, for determining whether input sound has been issued by a human is obtained. If it is determined in step S1202 based on the reference frequency range obtained in step S1201 that the input sound has been issued by a human, the process proceeds to step S1208. In step S1202, even if the input sound is included in the frequency range of human speech, information concerning elements other than general language speech, for example, a laughing voice and redundant words, i.e., information concerning "specific sound", which is registered as the knowledge of the apparatus, is acquired.

Thereafter, a determination is made in step S1209 as to whether the current input is specific speech. If the outcome of step S1209 is yes, the type of input is determined in step S1210, and a flag is set in step S1211 to indicate that the input sound is non-language information. If it is determined in step S1209 that the current input is not specific speech, a flag is set in step S1212 to indicate that the input speech is language information.

On the other hand, if it is determined in step S1202 that the input sound is outside the frequency range of human speech, a flag is set in step S1203 to indicate that the input sound is non-language information. In step S1204, information concerning the sound which should be specifically processed among the non-language information is acquired. It is then determined in step S1205 whether the input sound among the non-language information should be specifically processed. If the result of step S1205 is yes, the type of sound is obtained and set in step S1206. In contrast, if it is found in step S1205 that the input sound does not have to be specifically processed, the type of input sound is set to be noise in step S1207.

Figure 11:
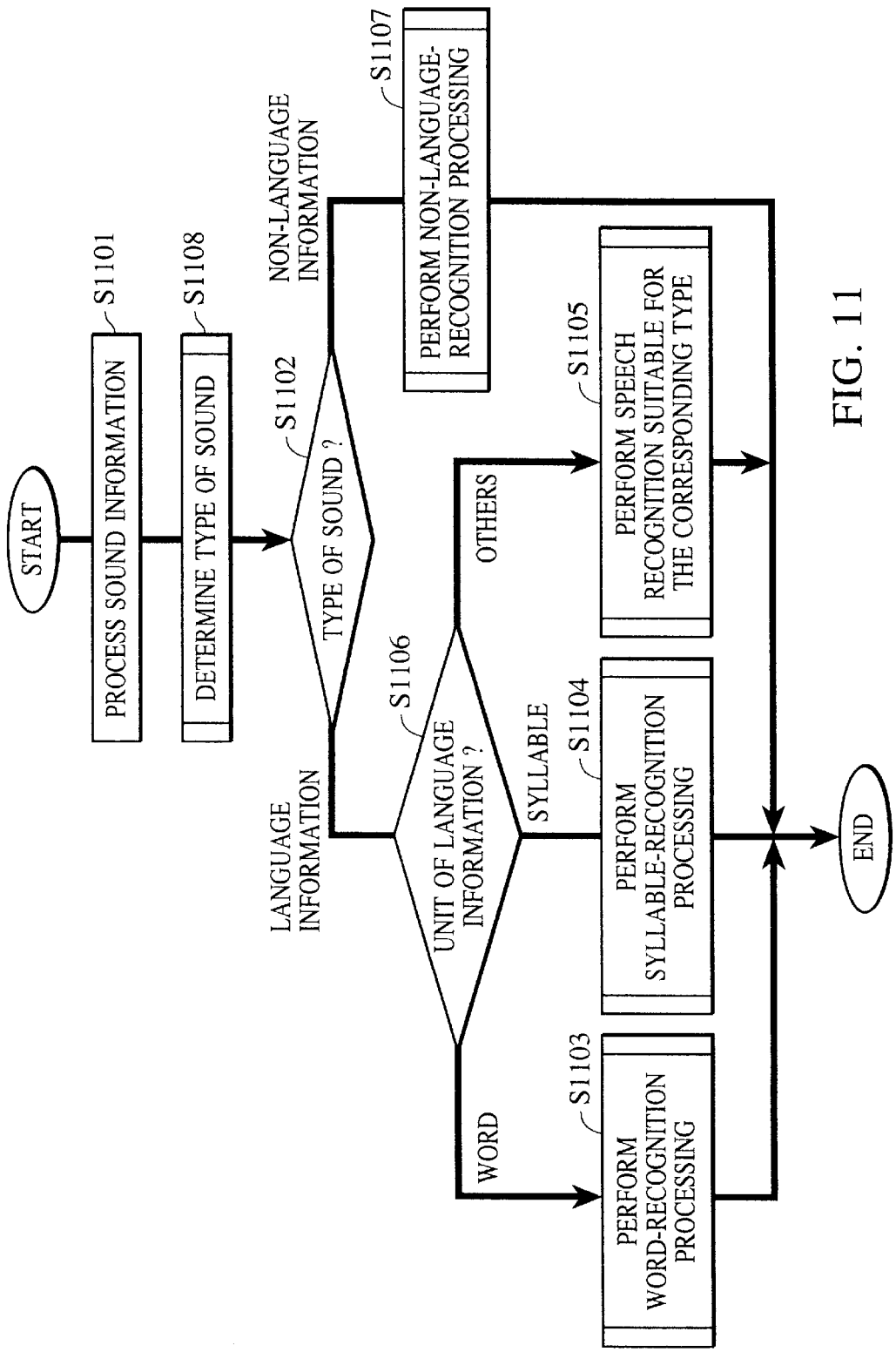
FIG. 11 is a flow chart illustrating the flow of speech recognition processing.

According to the determination process as described above, the type of speech is determined in step S1102 of FIG. 11. If the input speech is "Send mail to May", the type of speech is determined to be language information. Then, the unit of the language information is further determined in step S1106.

If the speed of the user's speech is fast, the unit of the language information is determined to be a longer unit, for example, a word rather than a phoneme. If a history indicates that the recognition of words has not been very successful, a shorter unit, for example, a phoneme, may be used as long as it is determined that speech recognition can be performed with the highest accuracy by using units of phonemes. This determination may be automatically made by the apparatus so as to improve the recognition rate. Alternatively, if it is desired by the user that recognition be made in units of words, the user may set the unit for recognition.

Figure 17:
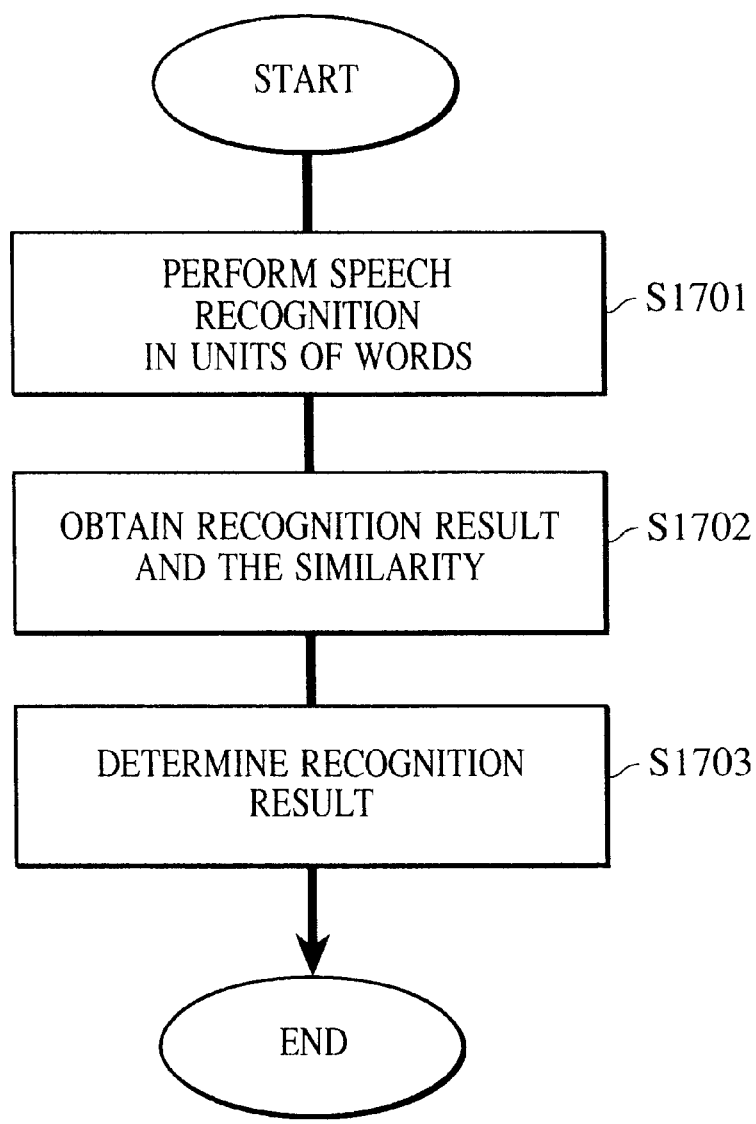
FIG. 17 is a flow chart illustrating the word-recognition processing.

If it is determined in step S1106 that the unit of the language information is, for example, a word, the word-recognition processing is performed in step S1103. The flow chart of this processing is shown in FIG. 17. In step S1701, speech recognition is performed in units of words by using the speech recognition unit. More specifically, in response to the input "Send mail to May", the word recognition is implemented by selecting the word "send" closest to the input sound information from the word dictionary provided for the speech recognition unit. In step S1702, the word "send" determined in the word recognition in step S1701 is obtained together with the similarity between "send" contained in the dictionary and the input speech (for example, 92% similarity). It is then determined in step S1703 whether the result of the word recognition is to be used.

Figure 18:
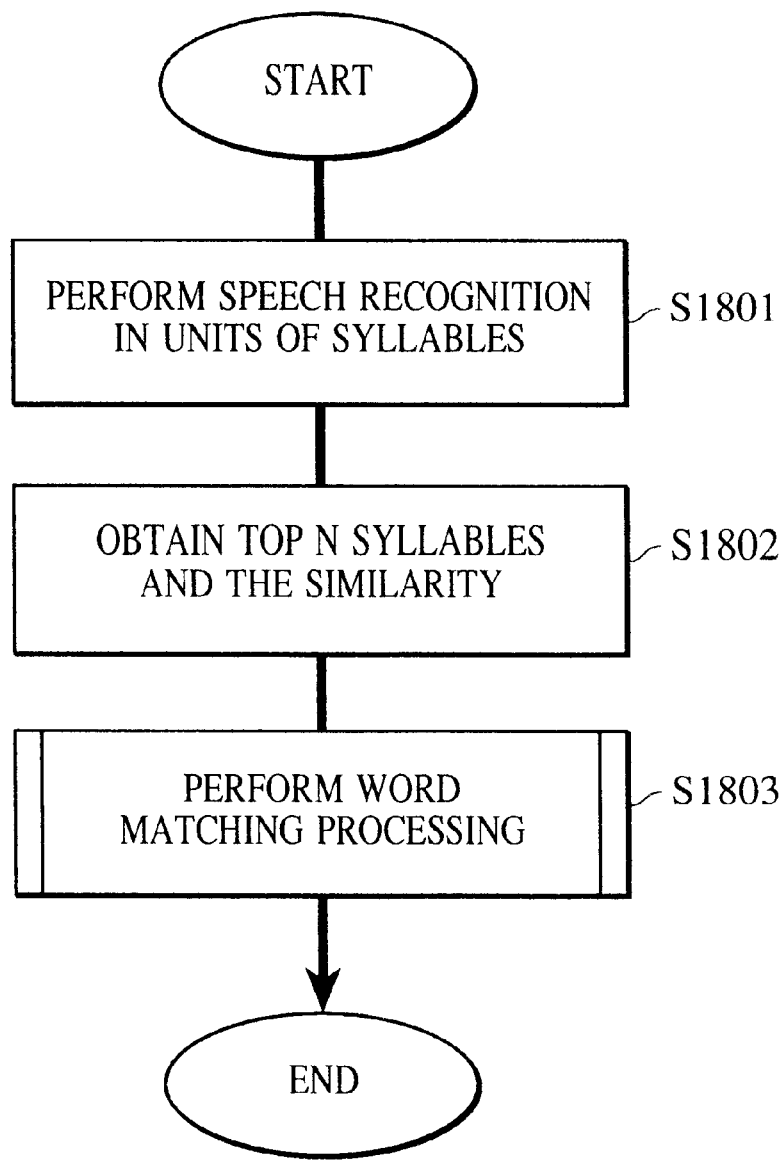
FIG. 18 is a flow chart illustrating the syllable-recognition processing.
Figure 19:
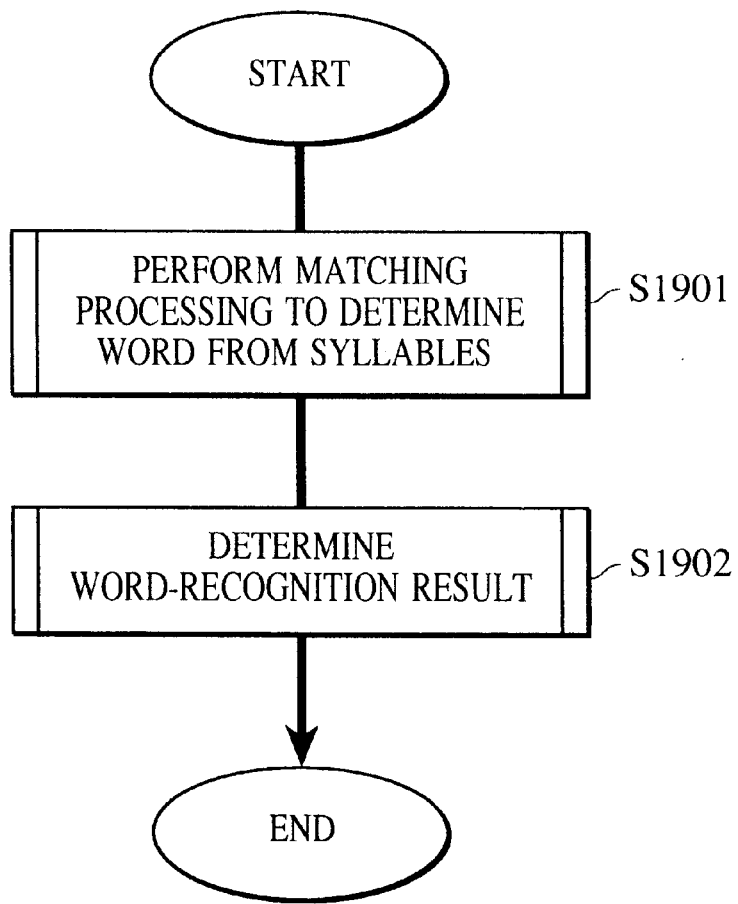
FIG. 19 is a flow chart illustrating matching processing between the syllable recognition result and the word provided for the system.

Referring back to FIG. 11, if it is determined in step S1106 that the type of speech is a syllable, syllable-recognition processing is executed in step S1104. The flow chart of this processing is shown in FIG. 18. In step S1801, speech recognition is conducted in units of syllables by using the speech recognition unit. In this example, the syllable recognition in units of syllables is implemented by selecting the top N syllables similar to the input sound information from the syllable dictionary provided for the speech recognition unit. In step S1802, the result of syllable recognition determined in step S1801 is acquired together with the similarity between the top N syllables and the information contained in the dictionary. In step S1803, the syllable determined in step S1802 is then recognized as the word "send" which can be handled by the system, and the similarity between the whole word and the input speech is output. The details of this processing are indicated by the flow chart of FIG. 19. Upon performing recognition processing in units of syllables, "se" is acquired in step S1901. Then, in step S1902, a suitable word that matches the syllable "se" is determined by using the result obtained in step S1901. It is also determined in step S1902 whether the result of the word recognition in step S1901 is to be employed.

Referring back to FIG. 11, if it is found in step S1106 that the type of speech is neither a word nor a syllable, the speech recognition suitable for the corresponding type is performed in step S1105. The type of speech which is neither a word nor a syllable may be a phoneme, which is shorter than a syllable, or a stereotyped phrase, such as a sentence, which is longer than a syllable. A plurality of types of units may be used for recognizing input information until a series of operations has been completed by the user. Alternatively, only one type of unit may be used.

Figure 37:
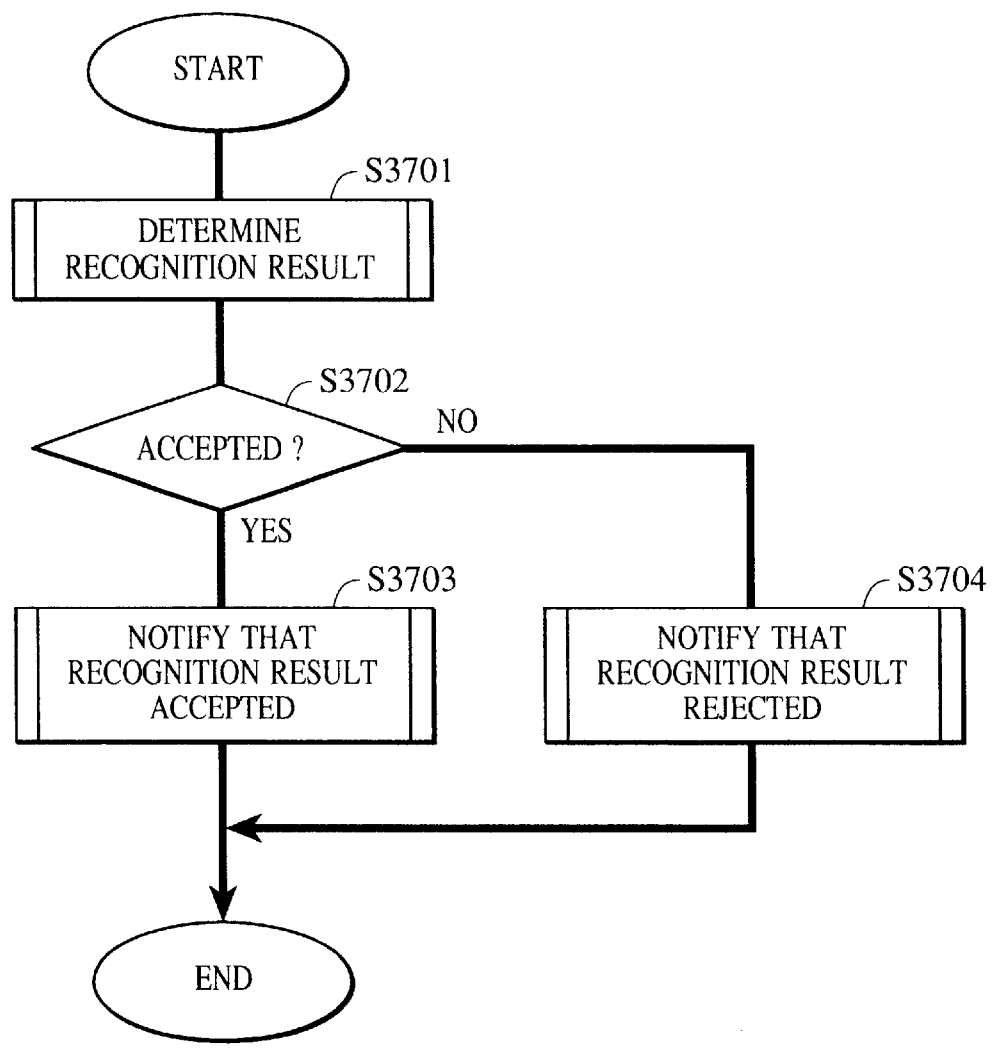
FIG. 37 is a flow chart illustrating the processing of determining a recognition result and of determining whether the recognition result is to be accepted.

Referring back to FIG. 10, the result obtained upon recognizing the input information in step S1001 is processed in step S1002. More specifically, it is determined in step S1703 of FIG. 17 and in step S1902 of FIG. 19 whether the recognition result is to be finally accepted as the input by the user. The detailed process is shown in FIG. 37.

In step S3701, processing for determining the recognition result is executed. More specifically, it is determined in step S3701 whether the recognition result is to be accepted, for example, by providing a threshold for the similarity of the speech recognition. It is now assumed that the threshold similarity is set to be 80%. If the recognition result is "send: 85% similarity", it is determined in step S3702 that the recognition result is to be accepted, and it is notified in step S3703 that the recognition result "send" has been accepted. Conversely, if the recognition result is "send: 70% similarity", it is determined in step S3702 that the recognition result is to be rejected, and it is reported in step S3704 that the recognition result has been rejected, so that a subsequent user's input is ready to be processed.

Referring back to FIG. 8, after recognizing various types of input information in step S805, the recognition result "send" is analyzed in step S806. In step S806, the processing is executed by primarily analyzing the concept of the word "send". The flow of this processing is schematically shown in FIG. 9. The recognition result is used for predicting a subsequent object to be recognized in step S904. The prediction for the subsequent object may be made in step S904 by using not only the recognition result, but also an analysis of the recognition result (step S901), a determination of the correctness of the result (step S902), and a correction of the result (step S903). It is not essential that all the processing in steps S901 through S903 be performed. Alternatively, only an analysis of the recognition result or only a correction of the result may be performed. Alternatively, a combination of a determination of the correctness of the result and a correction of the result, or a combination of an analysis of the recognition result and a determination of the correctness of the result may be performed. In step S905, according to the prediction generated in step S904, the prediction is updated for subsequent information to be recognized.

Figure 38:
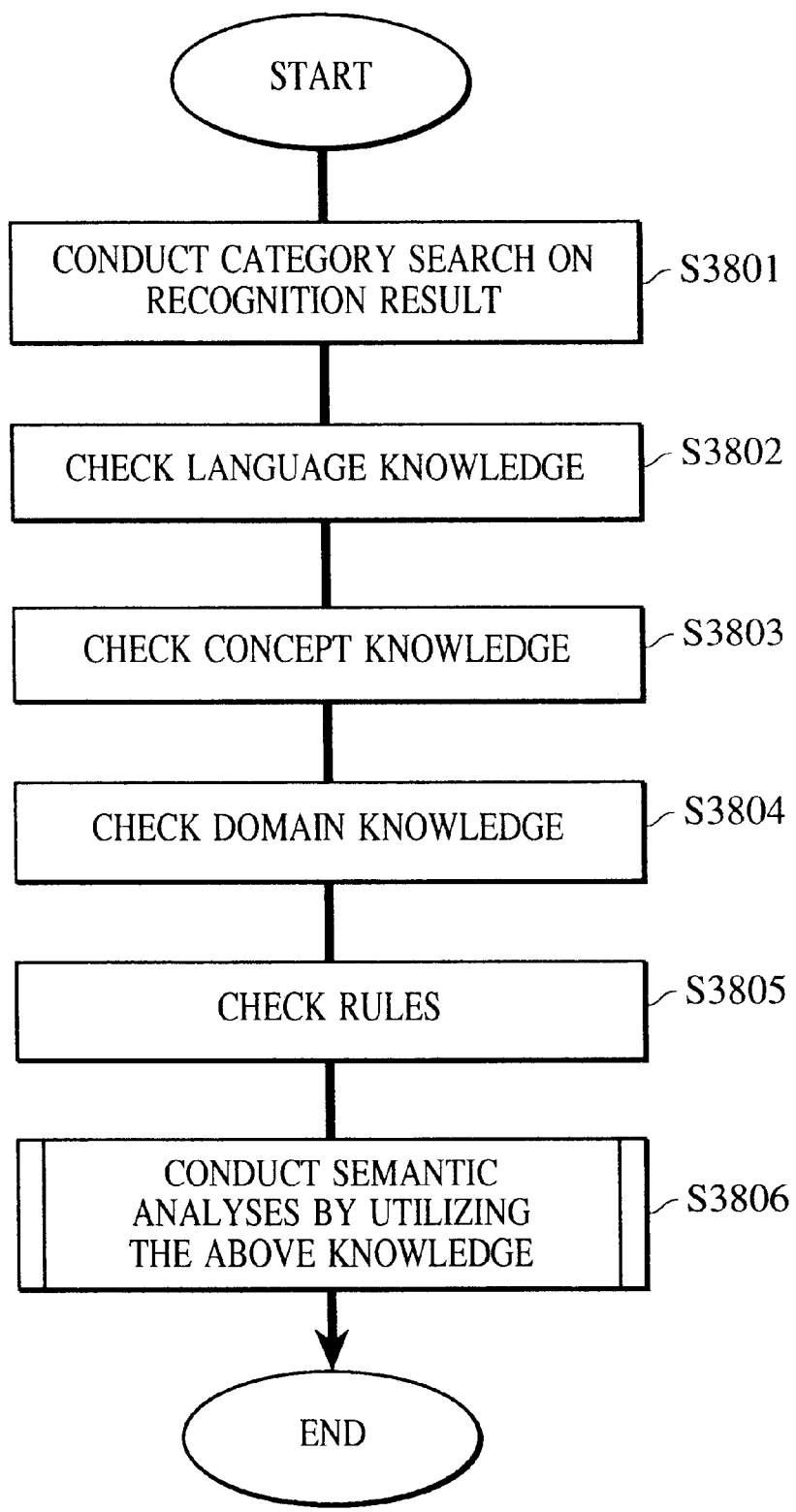
FIG. 38 is a flow chart illustrating the recognition-result analyzing processing.

An analysis of the recognition result in step S806 is more specifically shown by the flow chart of FIG. 38. In step S3801, a category search is conducted on the recognition result "send" so as to acquire information, such as the attribute of the word "send" and the context of the currently activated words. Subsequently, in step S3802, the language knowledge of the word "send" is checked from the language dictionary, such as that shown in FIG. 29, and in step S3803, the concept knowledge is checked from the concept dictionary, such as that shown in FIG. 30, thereby obtaining the corresponding information. In step S3804, the operation and the object of the word "send" are then checked from the domain of the apparatus. Thereafter, in step S3805, the rules of the system concerning the input of the word "send" are checked from a rule table, such as that illustrated in FIG. 31. As a consequence, in step S3806, semantic analyses are comprehensively conducted by employing the above knowledge.

Figure 39:
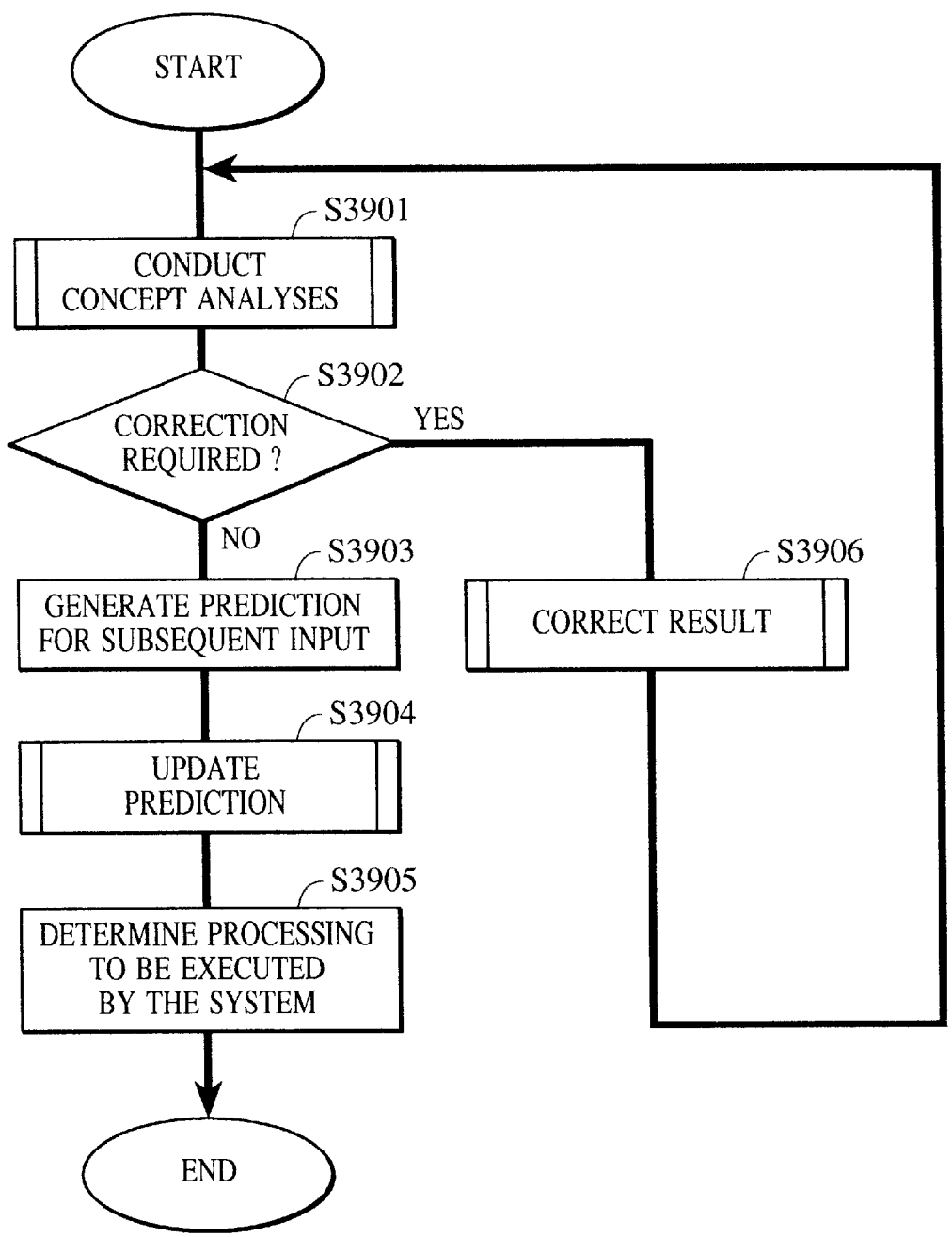
FIG. 39 is a flow chart illustrating a concept analysis and the processing of determining an analysis result.

More specifically, the semantic analyses in step S3806 are implemented by conducting concept analyses in step S3901 of FIG. 39 by utilizing the knowledge concerning the word "send" obtained in steps S3802 through S3805. In step S3802, by referring to the language dictionary, such as that shown in FIG. 29, it is found that "send" is a verb, which is followed by an object or the name of an apparatus. In step S3803, by referring to the concept dictionary, such as that shown in FIG. 30, it is found that "send" represents a physical transfer. In step S3805, by checking the rule table, such as that shown in FIG. 31, it is found that the object of "send" is mail or a document. Upon conducting the concept analyses in step S3901, it is determined in step S3902 whether the recognition result "send" obtained through speech recognition is correct in terms of semantics and common sense. A determination is also made in step S3902 as to whether the recognition result "send" satisfies the prediction set in response to the current input.

If the domain is represented by a printer, the verb "send" may be included in the initial prediction. It is thus determined in step S3902 that the verb "send" satisfies the initial prediction. Then, in step S3903, a prediction is made on a subsequent input, which is preceded by "send", by utilizing various types of knowledge in the system. In this case, it is predicted from the word "send" that the user is likely to specify "sending what", and that a subsequent input is likely to be an object. The prediction set as described above is updated in step S3904.

More specifically, in step S3904, the word dictionary provided for the speech recognition unit may be updated. Then, upon the concept analyses, the processing to be executed by the system in accordance with the user's purpose is determined in step S3905. In this case, since the system cannot execute the processing merely by the word "send", it waits for a subsequent information to be input according to the determination of the analysis result made in step S807.

Upon receiving speech "mail" from the user, the process proceeds in a manner similar to the above process. It is now assumed that a recognition result "mall" instead of "mail" be returned after conducting the speech recognition processing based on the prediction that a subsequent input may be an object, i.e., a noun. In the processing for determining the recognition result in step S3701, the semantic analyses are conducted in step S3806 by using the knowledge checked in steps S3801 through S3805. Upon checking the domain knowledge in step S3804, it can be considered that "mall" is not suitable as the input word. Then, it is determined in step S3902 that the result "mall" should be corrected. The flow then proceeds to step S3906.

Figure 40:
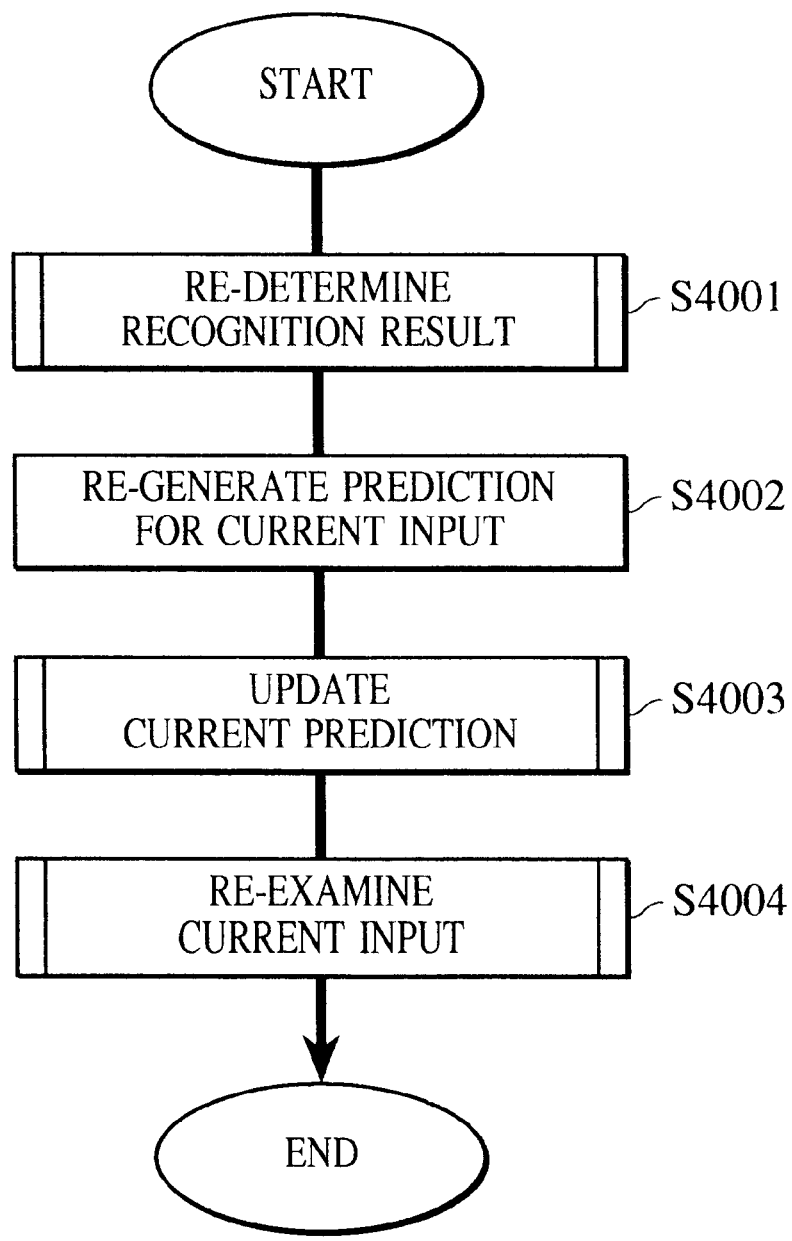
FIG. 40 is a flow chart illustrating the result correction processing.
Figure 41:
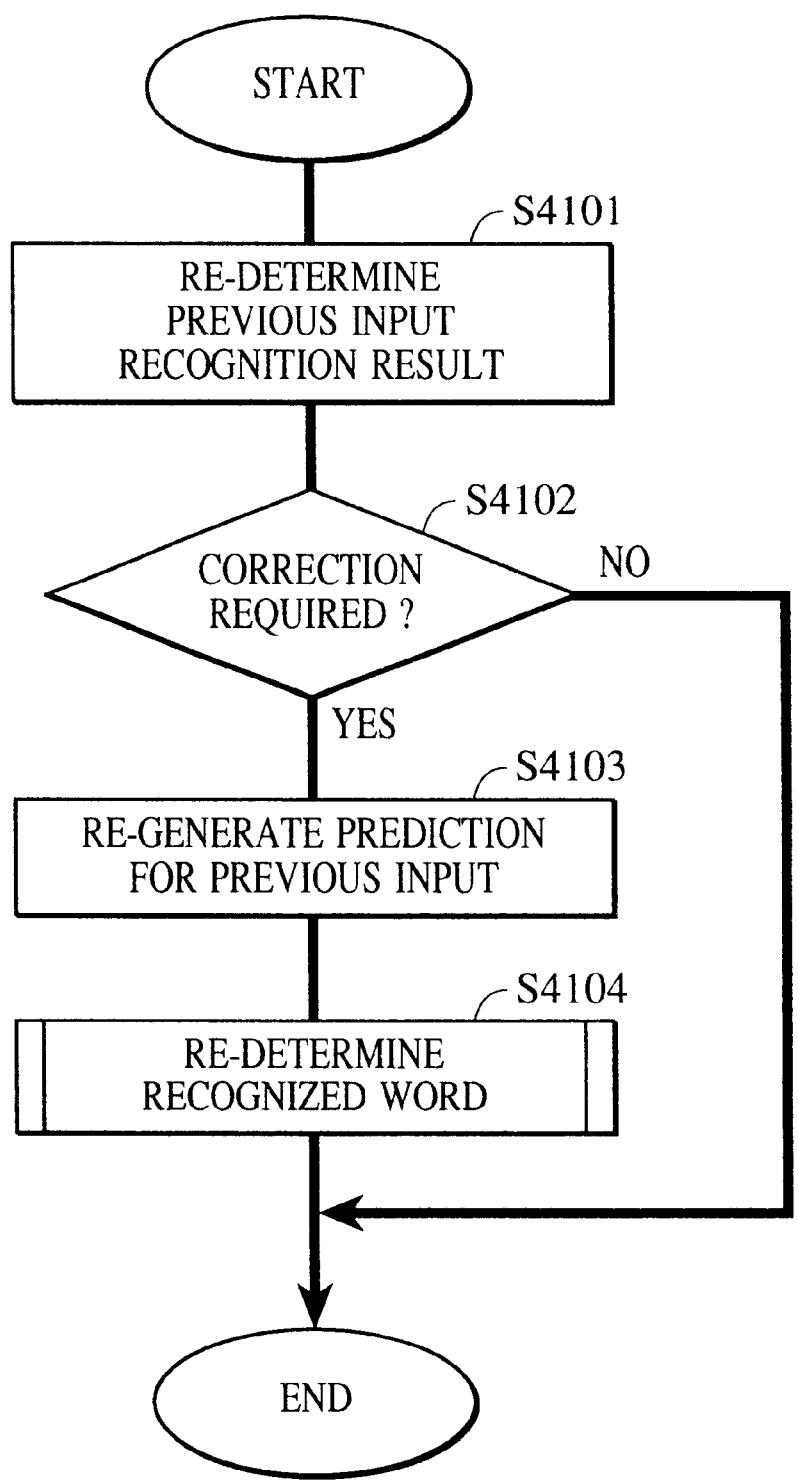
FIG. 41 is a flow chart illustrating the processing of re-determining the previous recognition result.

In order to re-determine the recognition result, a result re-determining processing is performed in step S4001 of FIG. 40. This processing is more specifically indicated by the flow chart of FIG. 41. In step S4101, the recognition result obtained so far is re-determined. If it is determined in step S4102 that the result should be corrected, the prediction for the previous input is re-generated in step S4103. In step S4104, the recognized word is re-determined. In this case, no corrections are made on the recognition result "send" since it is not necessary. Thus, a prediction for the current input is re-generated in step S4002 of FIG. 40 while the recognition result "send" remains the same. The re-generated prediction is then updated in step S4003, and the current input is again recognized by utilizing another type of knowledge in step S4004.

The updating of the prediction in step S4003 is to merge the newly generated prediction into the previous prediction.

Accordingly, even after performing this updating operation, the number of predictions is not increased, which would otherwise generate more matches. On the contrary, the prediction becomes more precise to restrict the number of possible words. For example, the current prediction is updated in step S4003 by a prediction that "mail" is more likely to be input than "mall" by considering the domain of the system. Upon re-examining the current recognition result in step S4004, it is determined that "mail" is more suitable than "male".

Figure 28:
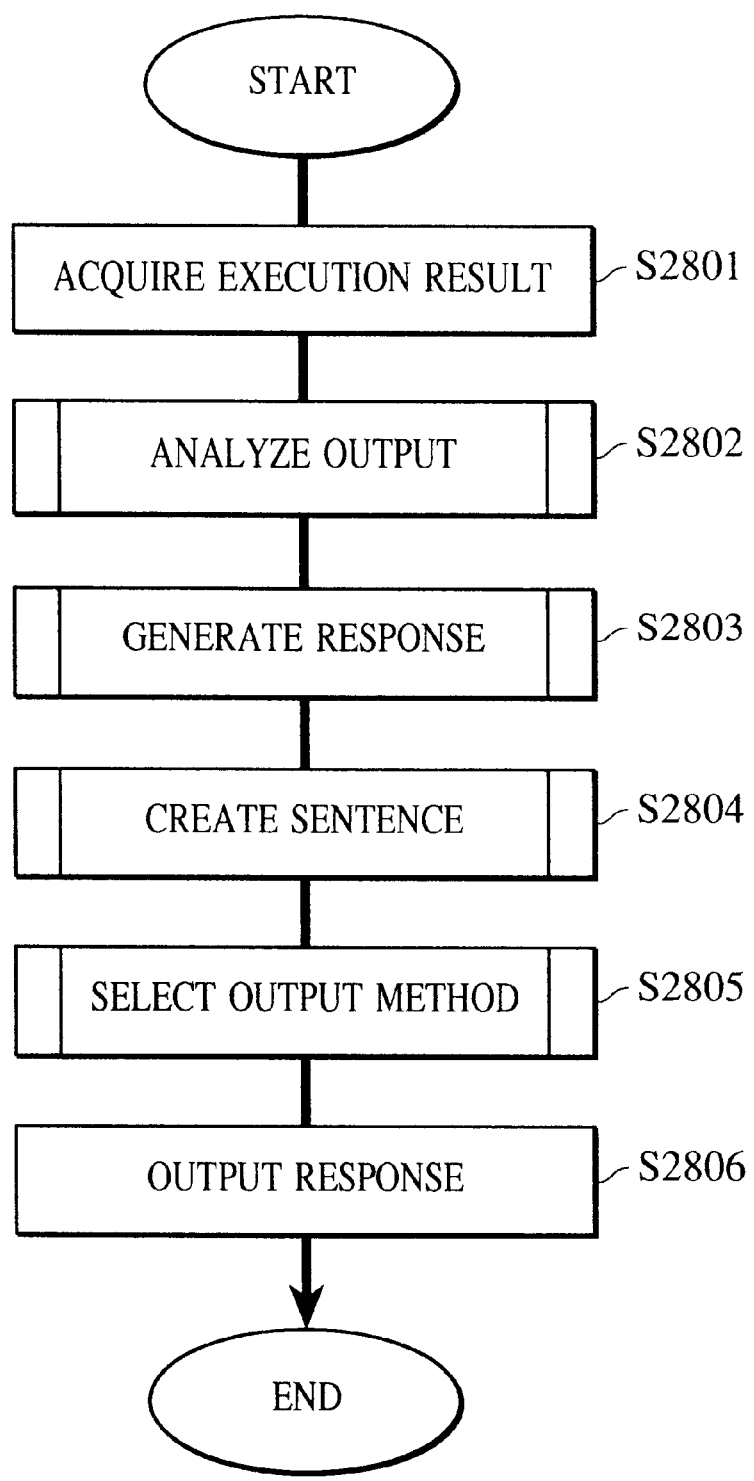
FIG. 28 is a flow chart illustrating the processing of generating a response to the user.

As discussed above, upon completion of recognizing the words "Send mail to May", it is determined in step S807 of FIG. 8 that the system should execute the processing. Then, in step S808, a command indicating "Send mail to May" is executed. During execution, May's mail address is checked in an address book provided for the system to ensure that mail is appropriately sent. After performing step S808, if it is determined that a response should be returned to the user, output processing is executed in step S809. FIG. 28 is a flow chart illustrating the process of generating a response to the user. More specifically, in step S2801, the status of the execution result is acquired. Then, in step S2802, the response to be output to the user is analyzed. In step S2803, a response to the user is actually generated by utilizing the knowledge of the system, and in step S2804, an actual sentence is created. In step S2805, the optimal output method is selected, and in step S2806, the response is output to the user. For example, a confirmation message, such as "Mail has been sent to May", may be output to the user in sound by performing speech synthesizing.

Second Embodiment

A description is given below of the flow of the processing performed on a speech input, such as "Send mail to May" when a syllable dictionary, a word dictionary, a language dictionary, and a concept dictionary are provided. as illustrated in FIGS. 25, 26, 29, and 30, respectively. A parameter setting procedure in the recognition processing is also discussed. It is now assumed that M number of words are registered in the word dictionary, and each word is divided into R[i] number of syllables, as shown in FIG. 32.

Figure 23:
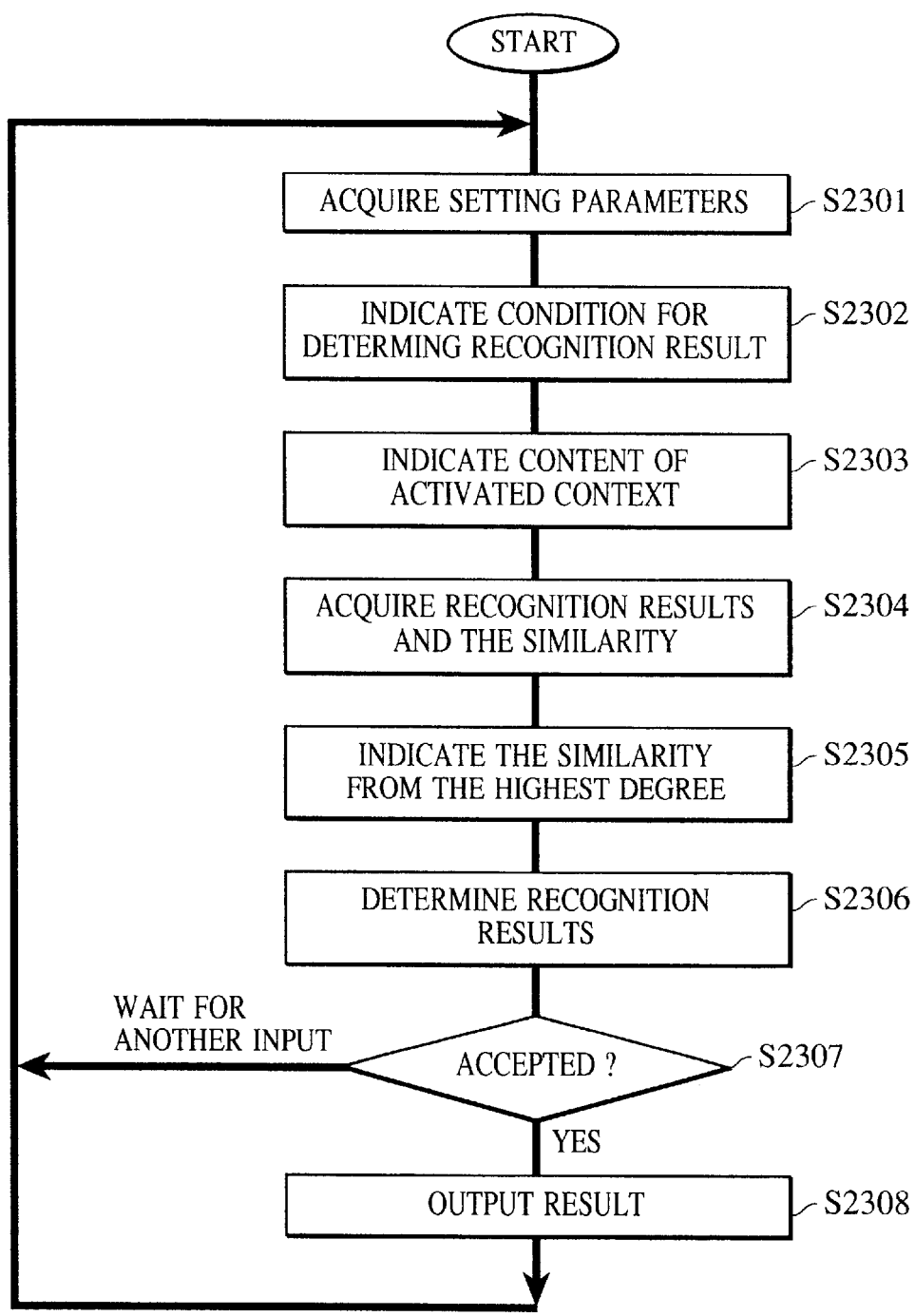
FIG. 23 is a flow chart illustrating the indication processing.
Figure 24:
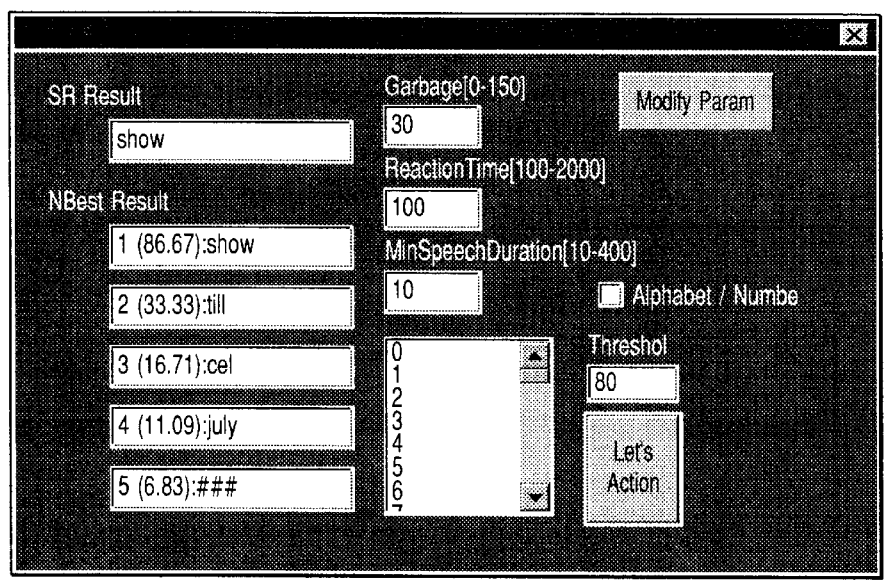
FIG. 24 illustrates the parameter-setting/result-indication screen.

Upon the start of the system, the screen, such as that shown in FIG. 24, appears. The parameter setting procedure is indicated by the flow chart of FIG. 23. In step S2301, parameters for setting the speech recognition engine, the Garbage level, the Rejection Time, and the Minimum Speech Duration, etc. are indicated. In step S2302, a reference of the similarity is indicated as a condition for determining the recognition result. Thereafter, in step S2303, the content of the currently activated context is indicated.

When the speech recognition method is employed, in which words are inferred from the result of syllable recognition in response to a speech input "Send mail to May", the following processing is performed. Upon receiving sound information "send", the sound information is first processed in step S1101 of FIG. 11. If it is determined in step S1102 that the type of processed information is a syllable, syllable-recognition processing is performed in step S1104. Then, speech recognition is conducted in units of syllables by using the speech recognition engine in step S1801 of FIG. 18, thereby obtaining the top N syllables as the recognition results. Referring back to FIG. 23, in step S2304, the recognition results obtained by the speech recognition engine and the similarity are acquired, and in step S2305, the obtained information, i.e., the recognition results in units of syllables and the similarity, is indicated according to the highest degree. In step S2306, the recognition results output from the speech recognition engine are determined, and the results are output after a result of the determination processing.

Figure 34:
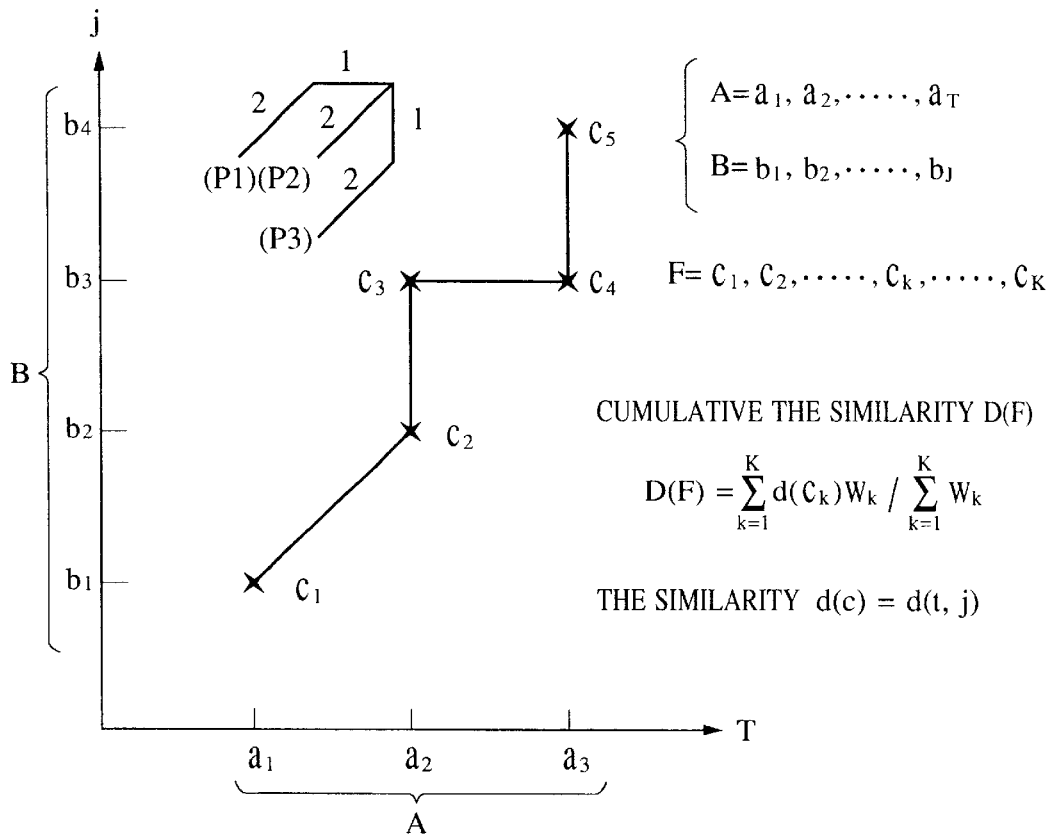
FIG. 34 illustrates a dynamic programming (DP) matching algorithm.

In the determination processing in step S2306, the results of the speech recognition engine are obtained in step S1802 of FIG. 18. In response to a speech input, i.e., "send", the result, such as that shown in FIG. 33, is obtained. By utilizing this result, syllable-to-word matching processing is performed in step S1803. More specifically, in step S1901, matching processing is performed to determine a suitable word from the syllables. In this embodiment, a dynamic programming (DP) matching method is used as the syllable-to-word matching method. In this DP matching method, matching is made between the word dictionary and the input speech according to the algorithm illustrated in FIG. 34.

Figure 20:
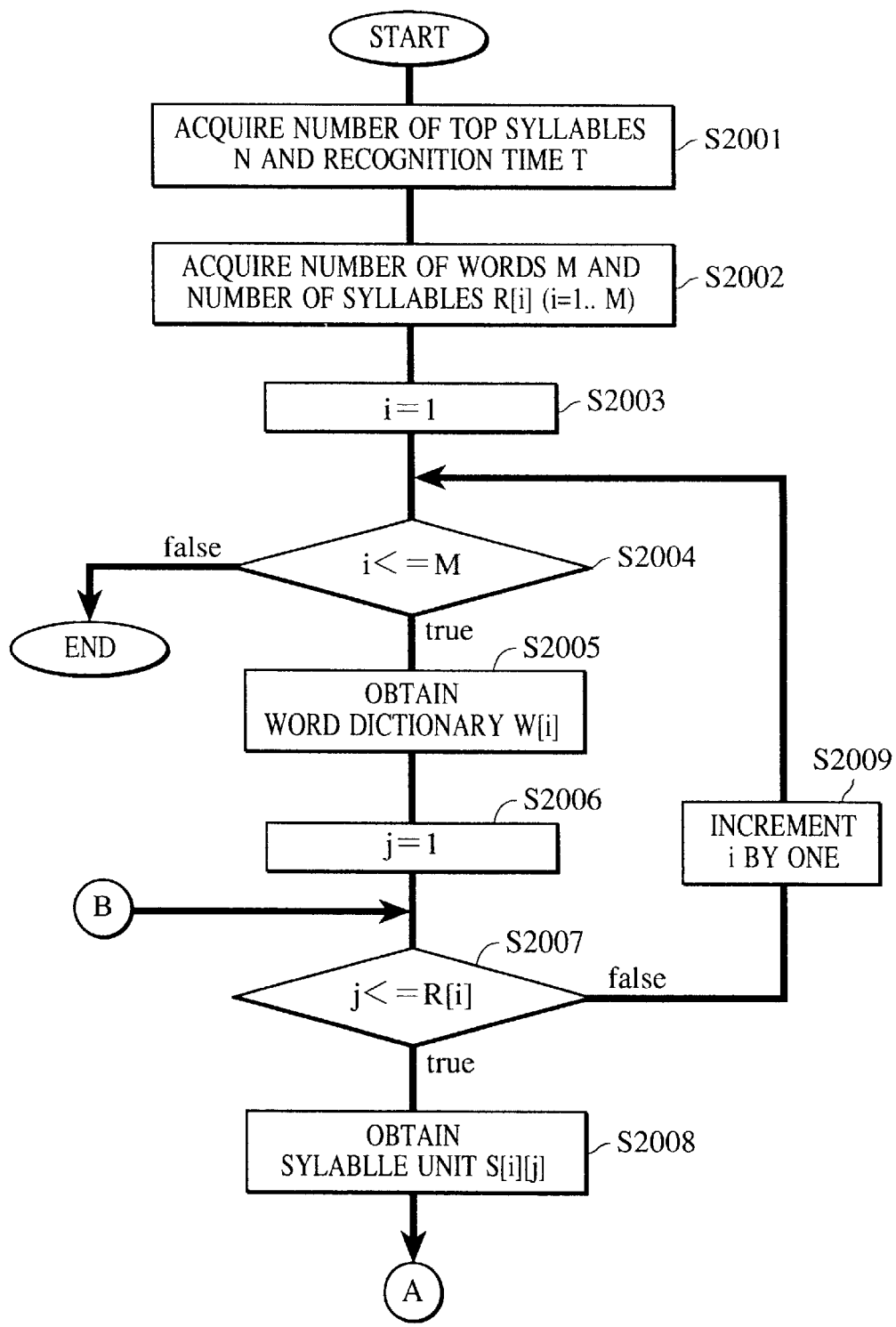
FIGS. 20 and 21 are flow charts illustrating the processing of determining the similarity of syllables.

The flow of the DP matching processing is shown in FIG. 20. In step S2001, the number of top syllables N and the number of syllables T recognized so far (recognition time) are acquired. FIG. 35 reveals that N is 5 and T is 0. Then, in step S2002, the number of words M registered in the system and the number of syllables R[i] forming each word are acquired. FIG. 36 reveals that M is 3, and R[1], R[2], and R[3] are 2, 2, and 4, respectively. In step S2003, i is set to be 1. Then, while the condition, i.e., i≦M, set in step S2004 is satisfied, the following processing is repeated. When it is determined in step S2004 that i is 1, the process proceeds to step S2005 in which the dictionary word W[i], i.e., "send", is obtained. In step S2006, j is set to be 1. Then, while the condition, i.e., J<R[1](=2), is satisfied, the processing for obtaining syllables forming "send" is repeated. Then, in step S2008, S[1][1]="se" is obtained.

Figure 21:
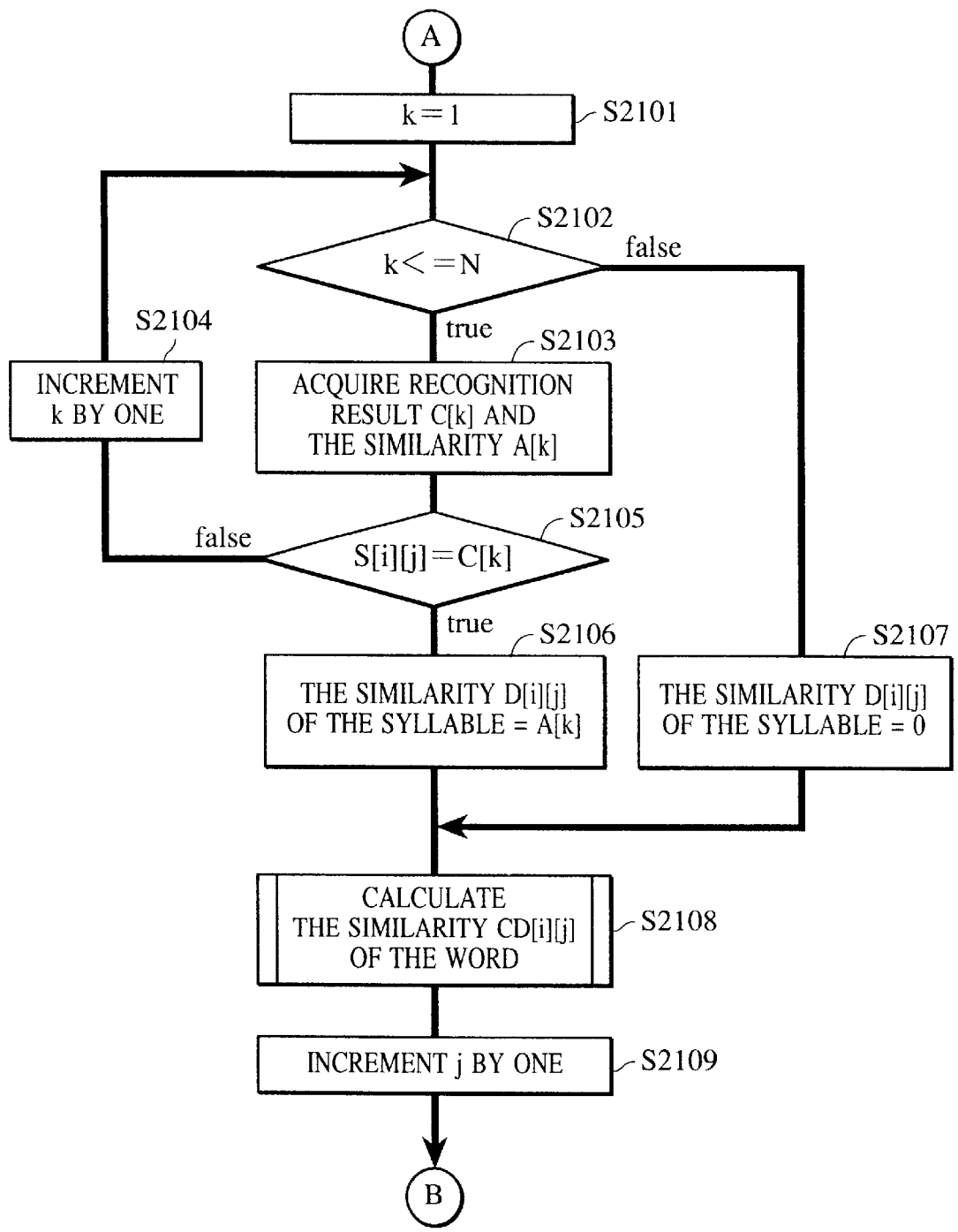

Subsequently, in step S2101 of FIG. 21, k is set to be 1. While the condition, i.e., k≦N(=5), is met in step S2102, it is determined whether S[1][1] is returned as a syllable that may match the input information. When it is determined in step S2102 that k is 1, the recognition result C[k] and the similarity A[k] are acquired in step S2103, resulting in C[1]="nd" and A[1]=60.4. When it is determined in step S2105 that S[1][1]≠C[1], k is incremented by one in step S2104, and a subsequent syllable that may match the input information is obtained and determined. When C[3]="se" and A[3]=38.9, the outcome of step S2105 is yes. Thus, the process proceeds to step S2106 in which the similarity D[1][1] of the syllable S[1][1]=A[3] is set to be 38.9. Then, in step S2108, the similarity CD[1][1] of the word W[1]= "send" is calculated.

Figure 22:
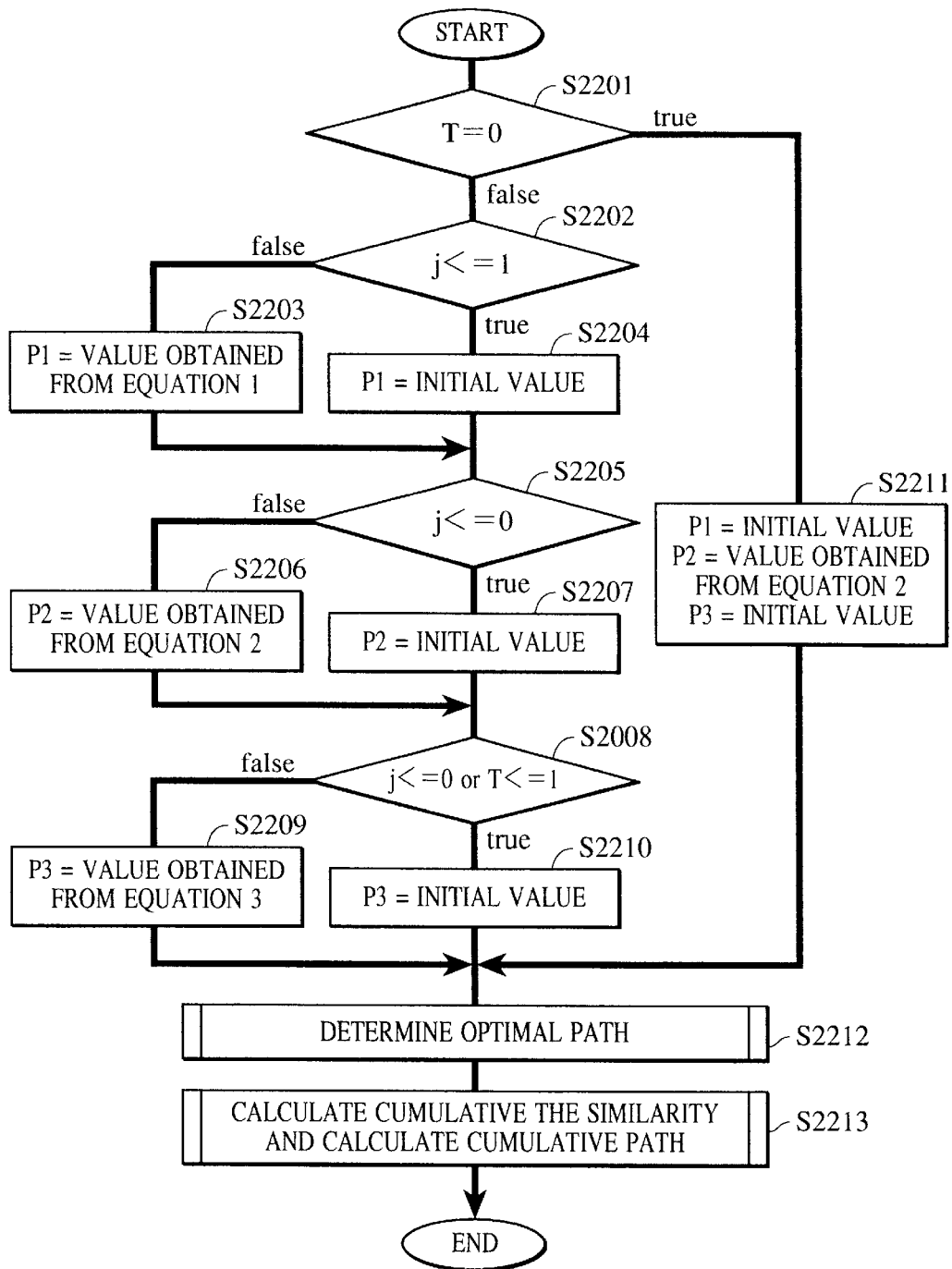
FIG. 22 is a flow chart illustrating the processing of calculating the similarity of the corresponding word by utilizing the similarity of syllables and the recognition time.

Referring to FIG. 22, it is then determined in step S2201 whether T is 0. In this case, since T is 0, the optimal path is calculated in step S2211 according to the equations illustrated in FIG. 34. That is, it is set in step S2211 that P1=1, P2=2 * 60.4=120.8, and P3=0. It is thus determined in step S2212 that P2=120.8 is the optimal path. In step S2213, the cumulative similarity and the cumulative path are calculated.

In this case, since the optimal path is 2, the cumulative similarity CD[1][1] is 120.8 and the cumulative path is 2. Referring back to FIG. 21, j is incremented by one, i.e., j=2, in step S2109. Then, the recognition result CD[1]="nd" and the similarity A[1]=61.0 are acquired in step S2103. Accordingly, the determination of step S2105 becomes true. The above-described calculations are then made in step S2108, and the result CD[1][2]=122.0 is obtained. Thereafter, j is incremented by one, i.e., j=3 in step S2109, and the determination of step S2007 becomes false. Accordingly, i is incremented by one, i=2, in step S2009. In this manner, the processing is repeated until i becomes 3. As a result, the similarity of words CD[1][1]=120.8, CD[1][2]= 122.0, CD[2][1]=107.4, CD[2][2]=41.2, CD[3][1]=58.2, CD[3][2]=0, CD[3][3]=0, and CD[3][4]=0 are obtained. When i becomes 4 in step S2009, the determination of step S2004 becomes false. Thus, the processing is completed, and the word-recognition result is subsequently determined in step S1902 of FIG. 19.

In step S1902, the result of syllable-to-word matching obtained when T is 0 is determined. According to the calculations conducted as described above, the exact word that may match the input sound has not yet been determined, and the system waits for a subsequent input. Upon receiving the subsequent input, the type of sound is determined in step S1102 of FIG. 11. In this case, since the previous input is a syllable and has not yet been recognized as a word, it is determined that the type of subsequent input may be again a syllable. The syllable-recognition processing is then performed in step S1104, and the syllable recognition results, such as those illustrated in FIG. 35, are returned in step S1802.

The recognition results are thus obtained in step S1802, and syllable-to-word matching is conducted in step S1803. In step S2001 of FIG. 20, the number of top syllables N obtained as the recognition results and the recognition time T are acquired. That is, N=1 and T=1 are obtained. As in the case of the processing executed when T=0, steps S2002 through S2109 are executed. As a result, the calculation results CD[1][1]=120.8, CD[1][2]=322.0, CD[2][1]=107.4, CD[2][2]=41.2, CD[3][1]=58.2, CD[3][2]=0, CD[3][3]=0, and CD[3][4]=0 are obtained. When i becomes 4 in step S2009, the determination of step S2004 becomes false, and the process proceeds to step S1902 in which the word-recognition result is determined.

According to the determination in step S1902, the word "send" is set to be the recognition result obtained by performing the recognition processing in step S805 of FIG. 8. It is determined in step S807 that the word "send" is to be accepted after analyzing the processed result in step S806.

According to the foregoing description, the speech input "Send mail to May" is first processed, and mail is transmitted to May, and finally, a response is output to the user. The whole processing is then completed.

Predictions conducted in units of a short speech unit, for example, a syllable, are effective particularly when only part of the whole speech was recognized. For example, even if input sound forming a word was not completely recognized, highly precise recognition can be expected if predictions made by utilizing the knowledge base are used in combination with the occurrence probability of each unit and the inter-state transition probability.

In outputting the recognized result, the determination of step S2307 is made based on the analysis of the processed result in step S806. If it is determined in step S2307 that the recognition result "send" is accepted, it is output as the final recognition result in step S2308. Similarly, the aforementioned processing is performed on a subsequent input. If there is a change of the parameters on the screen shown in FIG. 24, the newly set parameters are made valid, and determinations are made by using the new parameters.

Third Embodiment

According to the first and second embodiments, English-language speech recognition is performed. However, the Japanese language may be recognized based on predictions, and the corresponding processing may be appropriately executed by conducting concept analyses. In this case, language information is provided as a dictionary, and concept analyses are not dependent upon the type of language. Thus, differences in languages, such as English and Japanese, do not influence speech recognition by utilizing concept analyses.

Fourth Embodiment

According to the prediction technique shown in FIG. 13, not only speech information, which is likely to be input, but also information which is unlikely to be input, is predicted. Thus, the fact that exactly the same information is not input consecutively may be used for predictions so as to eliminate information which is unlikely to be input, thereby enhancing the recognition efficiency.

As is seen from the foregoing description, the present invention offers the advantage of improving the recognition accuracy by performing speech recognition based on predictions.

The present invention may be applied to a single apparatus or to a system formed of a plurality of apparatuses.

In another embodiment of the present invention, software program code for implementing the above-described functions may be supplied to an apparatus or a system, and a computer within the apparatus or the system may read the program code stored in a storage medium and execute it, so that the above-described functions can be implemented.

The function of the foregoing embodiment can be implemented not only by running the program code read by the computer, but also by executing the processing by, for example, an operating system (OS), running in the computer according to the instructions of the program code.

According to the above-described modifications, a storage medium storing the program code constitutes the present invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing apparatus comprising:

storage means for storing prediction information predicting a next phoneme, syllable, or word to be input based upon the meaning of one or more previously input words;

first determining means for determining whether inputted sound information is produced by a human;

means for acquiring information concerning specific language or non-language human sounds;

second determining means for determining whether the inputted sound information is the specific language or non-language human sounds;

third determining means for determining that the inputted sound information is language information in the event that said first determining means determines that the inputted sound information is produced by a human and said second determining means determines that the inputted sound information is not the specific language or non-language human sounds;

recognition means for recognizing the inputted sound information as a specific word, syllable, or phoneme, based on the prediction information predicting the current input word, syllable, or phoneme as a next word, syllable, or phoneme to be input based upon the meaning of one or more previously input words in the event that said third determining means determines that the inputted sound information is language information;

a knowledge base for storing knowledge concerning a type of data represented by the sound information and specific language or non-language human sounds;

prediction means for predicting a next word, syllable or phoneme to be input based upon the meaning of one or more previously input words by referring to the knowledge stored in said knowledge base; and updating means for updating the prediction information stored in said storage means based on a prediction result obtained by said prediction means.

2. An information processing apparatus according to claim 1, wherein said prediction means predicts the information to be subsequently recognized by said recognition means based on a previous recognition result recognized by said recognition means.

3. An information processing apparatus according to claim 1, wherein said prediction means predicts a type of data represented by information to be recognized by said recognition means.

4. An information processing apparatus according to claim 1, further comprising analysis means for analyzing information obtained as a recognition result by said recognition means, wherein said prediction means performs a predicting operation based on an analysis result obtained by said analysis means.

5. An information processing apparatus according to claim 1, wherein said recognition means outputs a plurality of items of information as a recognition result.

6. An information processing apparatus according to claim 5, wherein said prediction means predicts the information to be subsequently recognized in response to each of the plurality of items of information.

7. An information processing apparatus according to claim 1, wherein said prediction means predicts items of information which are likely to be subsequently input.

8. An information processing apparatus according to claim 7, wherein said recognition means selects a recognition result from among the items of information predicted by said prediction means.

9. An information processing apparatus according to claim 1, wherein said prediction means predicts an item of information which is less likely to be subsequently input.

10. An information processing apparatus according to claim 9, wherein said recognition means rejects the item of information which is less likely to be subsequently recognized.

11. An information processing apparatus according to claim 1, further comprising determination means for determining the correctness of information obtained as a recognition result by said recognition means.

12. An information processing apparatus according to claim 11, wherein said prediction means performs a predicting operation based on a determination result obtained by said determination means.

13. An information processing apparatus according to claim 11, further comprising correction means for correcting the information obtained as a recognition result by said recognition means based on a determination result obtained by said determination means.

14. An information processing apparatus according to claim 13, wherein said correction means corrects information obtained as a new recognition result by checking the knowledge stored in said knowledge base based on a previous recognition result.

15. An information processing apparatus according to claim 13, wherein said prediction means performs a predicting operation based on the recognition result obtained by said recognition means and performs a re-predicting operation based on a correction result obtained by correcting the recognition result by said correction means.

16. An information processing apparatus according to claim 1, wherein said first determining means distinguishes human speech from a mechanical sound based on a frequency difference.

17. An information processing apparatus according to claim 1, further comprising correction means for correcting information obtained as a recognition result by said recognition means, wherein said prediction means performs a predicting operation based on a correction result obtained by said correction means.

18. An information processing apparatus according to claim 1, wherein said recognition means recognizes speech information of a natural language in units of one of words, syllables, and phonemes.

19. An information processing apparatus according to claim 18, wherein said prediction means predicts a word including one of a syllable and a phoneme to be subsequently recognized when said recognition means uses one of the syllables and the phonemes, respectively, as a unit of recognition, and said prediction means predicts one of the syllable or the phoneme to be subsequently recognized based on the predicted word.

20. An information processing apparatus according to claim 18, further comprising selection means for selecting the unit for recognition.

21. An information processing apparatus according to claim 20, wherein said selection means selects the unit for recognition according to whether a previous recognition result was successfully obtained.

22. An information processing apparatus according to claim 1, wherein said recognition means recognizes the information by performing a matching operation by checking the knowledge stored in said knowledge base.

23. An information processing apparatus according to claim 22, wherein the matching operation comprises a dynamic programming matching.

24. An information processing apparatus according to claim 1, wherein said prediction means predicts the sound information to be subsequently recognized based on a previous operation.

25. An information processing apparatus according to claim 24, wherein said prediction means predicts a subsequent operation based on the previous operation and predicts the sound information to be subsequently recognized based on the predicted subsequent operation.

26. An information processing apparatus according to claim 25, herein said prediction means predicts a specific operation as the subsequent operation when it is unable to predict the subsequent operation based on the previous operation.

27. An information processing apparatus according to claim 24, wherein the sound information to be subsequently recognized comprises sound information to be initially recognized.

28. An information processing apparatus according to claim 1, wherein said knowledge base comprises language knowledge.

29. An information processing apparatus according to claim 28, wherein the language knowledge comprises a descriptive rule of natural-language information, and said prediction means predicts the sound information to be subsequently recognized based on the rule.

30. An information processing apparatus according to claim 1, wherein said knowledge base comprises domain knowledge.

31. An information processing apparatus according to claim 30, wherein said prediction means predicts, based on the domain knowledge, information belonging to a specific domain as the sound information to be subsequently recognized.

32. An information processing apparatus according to claim 1, wherein said knowledge base comprises general knowledge.

33. An information processing apparatus according to claim 1, wherein said prediction means predicts the sound information to be initially recognized.

34. An information processing apparatus according to claim 1, further comprising processing means for executing processing corresponding to a processing command when the processing command is recognized as a recognition result by said recognition means.

35. An information processing apparatus according to claim 34, further comprising reporting means for reporting a processing result obtained by said processing means.

36. An information processing apparatus according to claim 35, wherein said reporting means reports the processing result by sound.

37. An information processing method comprising:
- a first determining step for determining whether inputted sound information is produced by a human;
- an acquiring step for acquiring information concerning specific language or non-language human sounds;
- a second determining step for determining whether the inputted sound information is the specific language or non-language human sounds;
- third determining step for determining that the inputted sound information is language information in the event that said first determining step determines that the inputted sound information is produced by a human and said second determining step determines that the inputted sound information is not the specific language or non-language human sounds;
- a recognition step of recognizing the inputted sound information to be a specific word, syllable, or phoneme based on prediction information predicting the current input word, syllable, or phoneme as a next word, syllable, or phoneme to be input based upon the meaning of one or more previously input words in the event that inputted sound information is determined by said third determining step to be language information;
- a prediction step of predicting a next word, syllable, or phoneme to be input based upon the meaning of one or more previously input words by checking knowledge stored in a knowledge base for storing knowledge concerning a type of data represented by sound information and for storing the specific language or non-language human sounds; and
- an updating step of updating the prediction information based on a prediction result obtained in said prediction step.

38. An information processing method according to claim 37, wherein said prediction step predicts the information to be subsequently recognized in said recognition step based on a previous recognition result obtained in said recognition step.

39. An information processing method according to claim 37, wherein said prediction step predicts a type of data represented by information to be subsequently recognized in said recognition step.

40. An information processing method according to claim 37, further comprising an analysis step of analyzing information obtained as a recognition result in said recognition step, wherein said prediction step performs a predicting operation based on an analysis result obtained in said analysis step.

41. An information processing method according to claim 37, wherein said recognition step outputs a plurality of items of information as a recognition result.

42. An information processing method according to claim 41, wherein said prediction step predicts the information to be subsequently recognized in response to each of the items of information.

43. An information processing method according to claim 37, wherein said prediction step predicts items of information which are likely to be subsequently recognized.

44. An information processing method according to claim 43, wherein said recognition step selects a recognition result from among the items of information which are likely to be subsequently recognized.

45. An information processing method according to claim 37, wherein said prediction step predicts an item of information which is less likely to be subsequently recognized.

46. An information processing method according to claim 45, wherein said recognition step rejects the item of information which is less likely to be subsequently recognized.

47. An information processing method according to claim 37, further comprising a determination step of determining the correctness of information obtained as a recognition result in said recognition step.

48. An information processing method according to claim 47, wherein said prediction step performs a predicting operation based on a determination result obtained in said determination step.

49. An information processing method according to claim 47, further comprising a correction step of correcting the information obtained as a recognition result in said recognition step based on a determination result obtained in said determination step.

50. An information processing method according to claim 49, wherein said correction step corrects information obtained as a new recognition result by checking the knowledge stored in said knowledge base based on a previous recognition result.

51. An information processing method according to claim 49, wherein said prediction step performs a predicting operation based on a recognition result obtained in said recognition step and performs a re-predicting operation based on a correction result obtained by correcting the recognition result in said correction step.

52. An information processing method according to claim 37, wherein said first determining step distinguishes human speech from a mechanical sound based on a frequency difference.

53. An information processing method according to claim 37, further comprising a correction step of correcting information obtained as a recognition result in said recognition step, wherein said prediction step performs a predicting operation based on a correction result obtained in said correction step.

54. An information processing method according to claim 37, wherein said recognition step recognizes sound information of a natural language in units of one of words, syllables, and phonemes.

55. An information processing method according to claim 54, wherein said prediction step predicts a word including one of a syllable and a phoneme to be subsequently recognized when said recognition step uses one of the syllables and the phonemes, respectively as a unit for recognition, and said prediction step predicts one of the syllable and the phoneme to be subsequently recognized based on the predicted word.

56. An information processing method according to claim 47, further comprising a selection step of selecting the unit for recognition.

57. An information processing method according to claim 56, wherein said selection step selects the unit for recognition according to whether a previous recognition result was successfully obtained.

58. An information processing method according to claim 37, wherein said recognition step recognizes the information by performing a matching operation by checking the knowledge stored in said knowledge base.

59. An information processing method according to claim 58, wherein the matching operation comprises a dynamic programming matching operation.

60. An information processing method according to claim 37, wherein said prediction step predicts the sound information to be subsequently recognized based on a previous operation.

61. An information processing method according to claim 60, wherein said prediction step predicts a subsequent operation based on the previous operation, and predicts the sound information to be subsequently recognized based on the predicted subsequent operation.

62. An information processing method according to claim 61, wherein said prediction step predicts a specific operation as the subsequent operation when it is unable to predict the subsequent operation based on the previous operation.

63. An information processing method according to claim 60, wherein the sound information to be subsequently recognized comprises sound information to be initially recognized.

64. An information processing method according to claim 37, wherein said knowledge base comprises language knowledge.

65. An information processing method according to claim 64, wherein the language knowledge comprises a descriptive rule of natural-language information, and said prediction step predicts the sound information to be subsequently recognized based on the rule.

66. An information processing method according to claim 37, wherein said knowledge base comprises domain knowledge.

67. An information processing method according to claim 66, wherein said prediction step predicts, based on the domain knowledge, information belonging to a specific domain as the sound information to be subsequently recognized.

68. An information processing method according to claim 37, wherein said knowledge base comprises general knowledge.

69. An information processing method according to claim 37, wherein said prediction step predicts sound information to be initially recognized.

70. An information processing method according to claim 37, further comprising a processing step of executing processing corresponding to a processing command recognized as a recognition result in said recognition step.

71. An information processing method according to claim 70, further comprising a reporting step of reporting a processing result obtained in said processing step.

72. An information processing method according to claim 70, wherein said reporting step reports the processing result by sound.

73. A computer-readable storage medium storing a response program for controlling a computer to perform speech recognition, said program comprising codes for causing the computer to perform:
    a first determining step for determining whether inputted sound information is produced by a human;
    an acquiring step for acquiring information concerning specific language or non-language human sounds;
    a second determining means for determining whether the inputted sound information is the specific language or non-language human sounds;
    third determining step for determining that the inputted sound information is language information in the event that said first determining step determines that the inputted sound information is produced by a human and said second determining step determines that the inputted sound information is not the specific language or non-language human sounds;
    a recognition step of recognizing the inputted sound information as a specific word, syllable, or phoneme based on prediction information predicting the current input word, syllable, or phoneme as a next input word, syllable, or phoneme to be input based upon the meaning of one or more previously input words in the event that inputted sound information is determined by said third determining step to be language information;
    a prediction step of predicting a next word, syllable, or phoneme to be input based upon the meaning of one or more previously input words by checking knowledge stored in a knowledge base for storing knowledge concerning a type of data represented by sound information and for storing the specific language or non-language human sounds; and
    an updating step of updating the prediction information based on a prediction result obtained in said prediction step.

74. An information processing apparatus according to claim 1, wherein said third determining means determines that the inputted sound information is to be processed as non-language information in the event that said second determining means determines that the inputted sound information is the specific language or non-language human sounds, and said recognition means recognizes the inputted sound information as non-language information in the event that said third determining means determines that the inputted sound information is to be processed as non-language information.

75. An information processing method according to claim 37, wherein said third determining means determines that the inputted sound information is to be processed as non-language information in the event that said second determining means determines that the inputted sound information is the specific language or non-language human sounds, and said recognition step recognizes the inputted sound information as non-language information in the event that said third determining step determines that the inputted sound information is to be processed as non-language information.

76. An information processing apparatus according to claim 1, wherein said third determining means determines that the inputted sound information is to be processed as non-language information in the event that said first determining means determines that the inputted sound information is not produced by the human, and said recognition means recognizes the inputted sound information as non-language information in the event that said third determining means determines that the inputted sound information is to be processed as non-language information.

77. An information processing method according to claim 37, wherein said third determining step determines that the inputted sound information is to be processed as non-language information in the event that said first determining step determines that the inputted sound information is not produced by the human, and said recognition step recognizes the inputted sound information as non-language information in the event that said third determining step determines that the inputted sound information is to be processed as non-language information.

\* \* \* \* \*